United States Patent [19]

Cleary et al.

[11] 4,454,582

[45] Jun. 12, 1984

[54] METHOD AND APPARATUS FOR CONTINUOUSLY DETERMINING A CHRONODRASIC INTERVAL

[75] Inventors: Patrick J. Cleary, Federal Way; Craig A. Hopperstad, Seattle, both of Wash.

[73] Assignee: The Boeing Company, Seattle, Wash.

[21] Appl. No.: 359,269

[22] Filed: Mar. 18, 1982

Related U.S. Application Data

[63] Continuation-in-part of Ser. No. 59,664, Jul. 23, 1979, abandoned.

[51] Int. Cl.³ .................... G06F 15/50; G01C 21/00
[52] U.S. Cl. .................... 364/427; 73/178 T; 244/183; 340/972; 364/428; 364/433
[58] Field of Search ............ 364/426, 427, 428, 430, 364/433; 244/180, 183, 186; 73/178 T, 178 R; 340/26, 27 R, 27 NA, 27 SS; 343/7 TA, 5 LS, 5 GC

[56] References Cited

U.S. PATENT DOCUMENTS

| | | | |
|---|---|---|---|
| 3,048,329 | 8/1962 | Berggren | 364/427 |
| 3,077,110 | 2/1963 | Gold | 364/427 X |
| 3,086,394 | 4/1963 | Peck | 73/178 T |
| 3,128,445 | 4/1964 | Hosford | 340/27 NA |
| 3,159,738 | 12/1964 | James et al. | 364/427 |
| 3,504,335 | 3/1970 | Hall et al. | 364/427 X |
| 3,585,375 | 6/1971 | Hedrick | 235/92 T |
| 3,738,166 | 6/1973 | Fisher | 73/178 T |
| 3,865,071 | 2/1975 | Manor | 73/178 T X |
| 4,122,522 | 10/1978 | Smith | 364/427 |

Primary Examiner—Joseph F. Ruggiero
Attorney, Agent, or Firm—Christensen, O'Connor, Johnson & Kindness

[57] ABSTRACT

A method and apparatus for determining the time remaining for maximum control action to be taken in order to achieve a desired objective (i.e., the chronodrasic interval) is disclosed. The method and apparatus continuously determines the amount of a parameter (e.g., runway distance) required to achieve a desired objective (e.g., stopping an aircraft before reaching the end of a runway on landing or accelerating an aircraft so that it reaches rotation speed before reaching the end of a runway on takeoff) if maximum control action is applied. The method and apparatus also continuously determines the total amount of the parameter remaining. The chronodrasic interval is then determined by deducting the amount of the parameter required to achieve the desired objective if maximum control action is taken from the total amount of the parameter remaining; and, dividing the result by a preselected (e.g., present or maximum) rate of change of the parameter. The value of the chronodrasic interval, if below a predetermined value, is applied to a display to provide interactive information adapted to apprise a human operator of the need to take control action and the effectiveness of the control action taken. Alternatively, the value of the chronodrasic interval can be used to automatically regulate the amount of control action taken.

46 Claims, 27 Drawing Figures

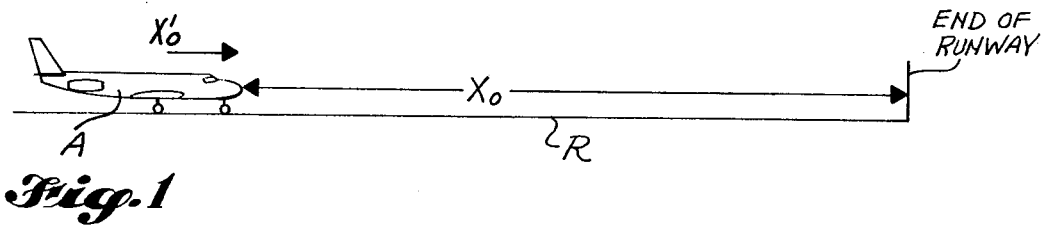
Fig. 1
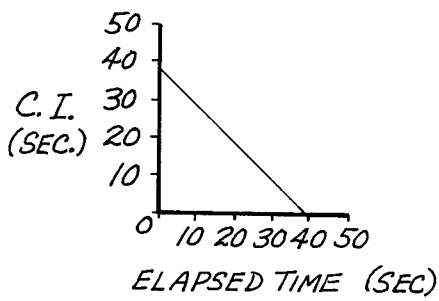
Fig. 2A
| DISTANCE (Ft.) | ELAPSED TIME (SEC) | C.I. (SEC) |
|---|---|---|
| 2000 | 0 | 38 |
| 1500 | 10 | 28 |
| 1000 | 20 | 18 |
| 500 | 30 | 8 |
| 300 | 34 | 4 |
| 100 | 38 | 0 |
SPEED = 50 FT/SEC.
MAX DEC. = 12.5 FT/SEC.$^2$
Fig. 2B
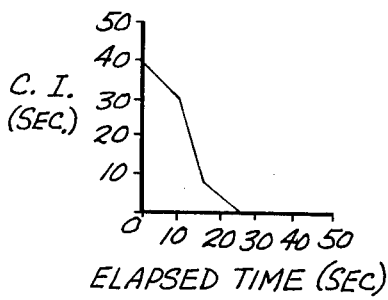
Fig. 3A
| DISTANCE (FT.) | SPEED (FT/SEC) | ELAPSED TIME (SEC) | C.I. (SEC) |
|---|---|---|---|
| 2000 | 50 | 0 | 38 |
| 1500 | 50 | 10 | 28 |
| 1000 | 100 | 16.7 | 6 |
| 500 | 100 | 21.7 | 1 |
| 400 | 100 | 22.7 | 0 |
MAX DEC. = 12.5 FT/SEC$^2$
Fig. 3B

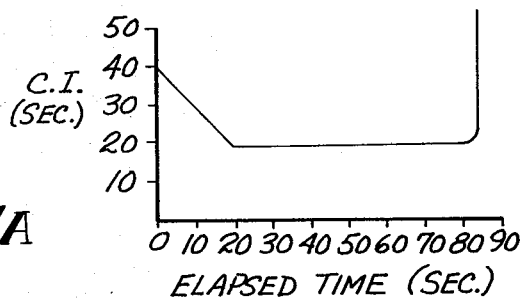
*Fig.* 4A
*Fig.* 4B
| DISTANCE (FT.) | SPEED (FT/SEC.) | ELAPSED TIME (SEC) | C.I.(SEC.) |
|---|---|---|---|
| 2000 | 50 | 0 | 38 |
| 1500 | 50 | 10 | 28 |
| 1000 | 50 | 20 | 18 |
| 500 | 25 | 33.3 | 19 |
| 400 | 20 | 37.7 | 19.2 |
| 300 | 15 | 43.1 | 19.4 |
| 200 | 10 | 51.1 | 19.6 |
| 100 | 5 | 64.4 | 19.8 |
| 50 | 0 | 84.0 | ∞ |
MAX DEC. = 12.5 FT/SEC$^2$
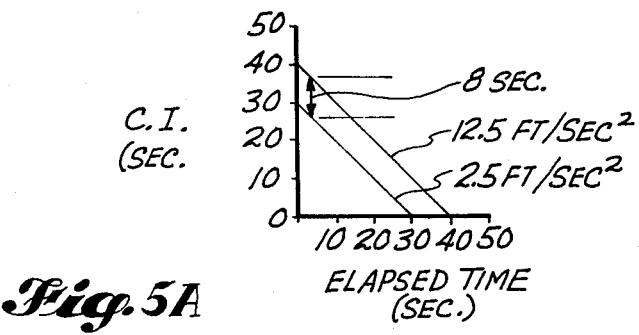
*Fig.* 5A
*Fig.* 5B
| DISTANCE (FT) | SPEED (FT/SEC.) | ELAPSED TIME (SEC) | C.I. (SEC) [2.5 FT/SEC$^2$] | [12.5 FT/SEC$^2$] |
|---|---|---|---|---|
| 2000 | 50 | 0 | 30 | 38 |
| 1500 | 50 | 10 | 20 | 28 |
| 1000 | 50 | 20 | 10 | 18 |
| 500 | 50 | 30 | 0 | 8 |

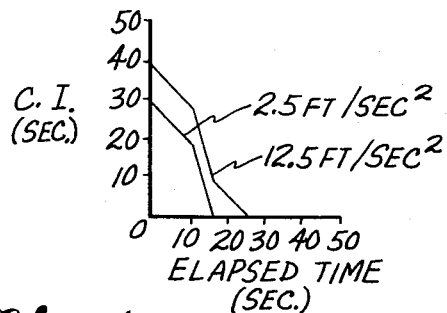
Fig. 6A
Fig. 6B
| DISTANCE (FT.) | SPEED (FT/SEC) | ELAPSED TIME (SEC) | C.I. (SEC) [2.5 FT/SEC²] | [12.5 FT/SEC²] |
|---|---|---|---|---|
| 2000 | 50 | 0 | 30 | 38 |
| 1500 | 50 | 10 | 20 | 28 |
| 1000 | 100 | 16.7 | 0 | 6 |
| 500 | 100 | 21.7 |  | 1 |
| 400 | 100 | 22.7 |  | 0 |
Fig. 7A
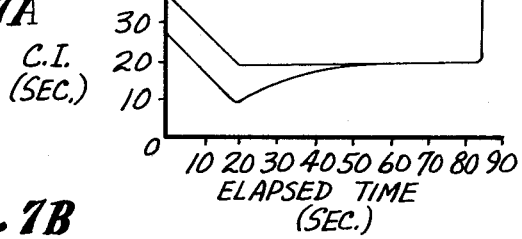
Fig. 7B
| DISTANCE (FT) | SPEED (FT/SEC) | ELAPSED TIME (SEC) | C.I. (SEC) [2.5 FT/SEC²] | [12.5 FT/SEC²] |
|---|---|---|---|---|
| 2000 | 50 | 0 | 30 | 38 |
| 1500 | 50 | 10 | 20 | 28 |
| 1000 | 50 | 20 | 10 | 18 |
| 500 | 25 | 33.3 | 15 | 19 |
| 400 | 20 | 37.7 | 16 | 19.2 |
| 300 | 15 | 43.1 | 17 | 19.4 |
| 200 | 10 | 51.1 | 18 | 19.6 |
| 100 | 5 | 64.4 | 19 | 19.8 |
| 50 | 0 | 84.0 | ∞ | ∞ |

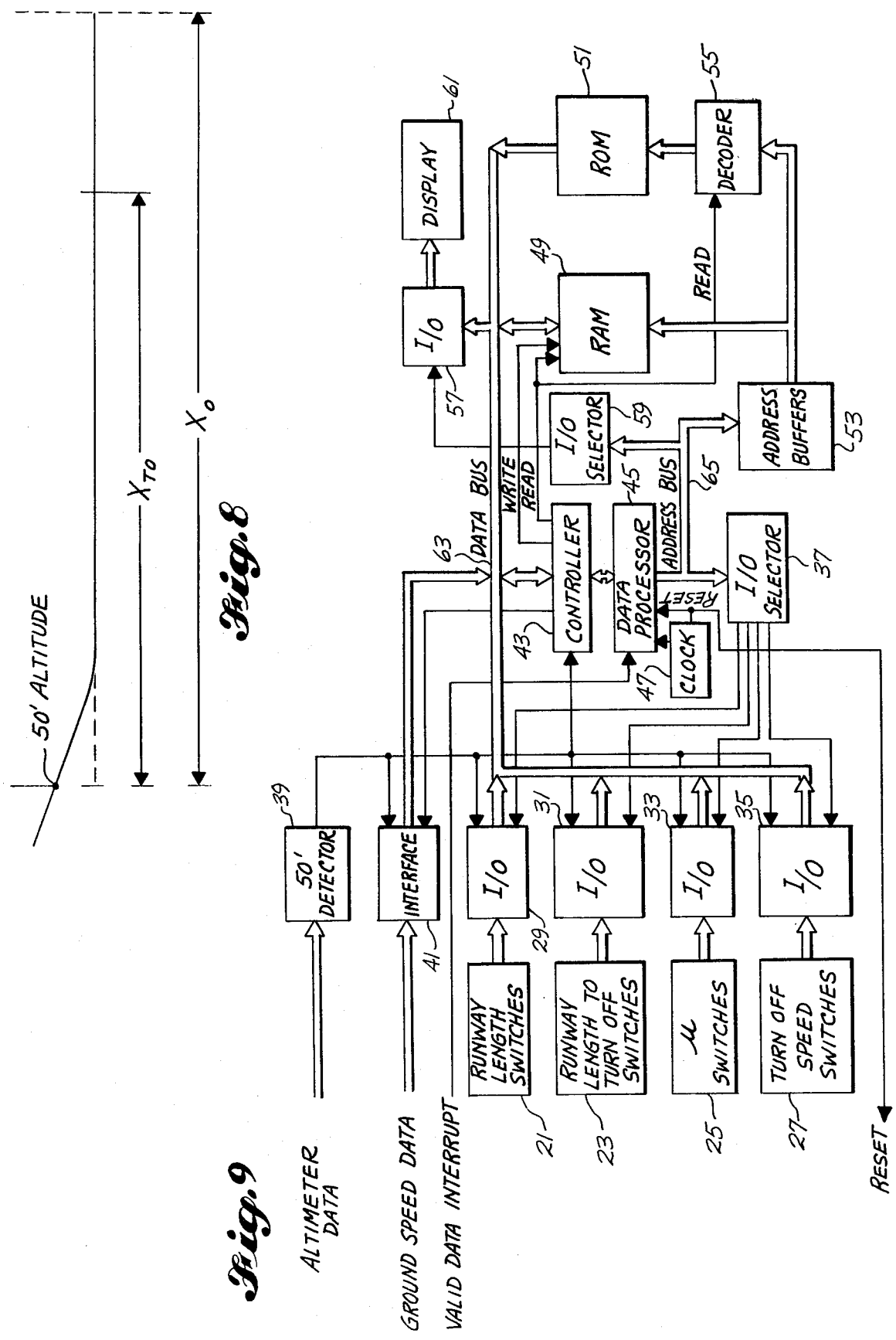

though, as will be better understood from the following discussion, the present invention was developed for

METHOD AND APPARATUS FOR CONTINUOUSLY DETERMINING A CHRONODRASIC INTERVAL

RELATIONSHIP TO OTHER APPLICATIONS

This application is a continuation-in-part of United States Patent Application Ser. No. 059,664 filed July 23, 1979 and entitled "Method and Apparatus for Continuously Determining A Chronodrasic Interval" abandoned.

TECHNICAL AREA

This invention relates to methods and apparatus for determining the occurrence of events and, more particularly, methods and apparatus for achieving a desired objective related to such events.

BACKGROUND OF THE INVENTION

While, as will be better understood from the following discussion, the present invention was developed for use on board aircraft to assist the pilot in achieving a desired objective, and is described in such an environment, it is to be understood that the invention is also useful in other environments, particularly vehicular environments to provide a similar result. Also, as will be better understood from the following discussion, as used herein, the term "desired objective" covers a multitude of objectives, including both the avoidance of potentially hazardous incidents (e.g., an aircraft not stopping or not taking off before reaching the end of a runway) and the achievement of desirable results (such as an aircraft's speed dropping to a desired value when a particular exit ramp is reached after a landing).

Modern commercial aircraft include a wide variety of warning and caution signals designed to assist a pilot in accomplishing a safe flight from takeoff to landing. The warning and caution signals are designed to advise the pilot of the occurrence of a condition that could prevent the achieving of a safe flight. While it is difficult to establish an exact definition of the difference between warning and caution signals, the most common definition appears to be that a warning signal signifies a condition to which a relatively immediate response must be made, and a caution signal is one to which a response may be safely delayed for some time period. In either case, warning and caution signals advise the pilot that a particular condition has occurred that may have an effect on the accomplishment of a safe flight between takeoff and landing. However, the pilot is not advised as to how soon he must take action in order to prevent the condition from frustrating his ability to achieve a safe flight. In many instances, such information is desirable. That is, in many situations, an indication of the time in which action must be taken to avoid the occurrence of an event that will prevent the accomplishment of the pilot's main objective would be valuable. An example of a situation in which such an indication would be helpful is that of an overshot touchdown on a slippery runway. Whether to try to stop the aircraft or to "go around" is now merely a matter of pilot judgement. In many instances, the proper decision is difficult to make. A clear indication of whether or not there is adequate time to make a stop under existing conditions would aid the pilot in such a situation to make the correct decision. Another situation currently requiring pilot judgment is the rejected "take-off" situation. This situation is particularly difficult to judge if it is precipitated by trouble other than engine failure. Current procedure uses indicated airspeed as a go/stop criterion in rejected take-off situations. This criterion is adequate if engine failure is the cause of the refused take-off situation, but inadequate if the refused take-off situation is caused by other factors. An indication to the pilot of whether or not a safe take-off and/or a safe stop can be achieved under a wide variety of existing conditions would greatly enhance the pilot's ability to make the correct decision. A further situation is one wherein the aircraft is sinking on approach and a determination must be made to either attempt to land or "go-around" and make another landing approach. An indication to the pilot of whether or not a safe landing and/or a safe go-around can be achieved under existing conditions would also greatly enhance the pilot's ability to make the correct decision.

In summary, a method of and an apparatus for providing a pilot with interactive information adapted to assist him in making the proper decision under many situations by providing him with an indication of the time in which action must be taken in order to accomplish a desired objective is desirable. Such a method and apparatus that can be alternatively used to automatically control certain aspects of an aircraft to achieve the desired objective is also desirable. For purposes of description, the interval of time in which action must be taken to achieve a desired objective is herein denoted the chronodrasic interval. The word chronodrasic is derived from Greek and means literally time for action (chronos-time, drasis-action).

It is an object of this invention to provide a method of and an apparatus for continuously determining chronodrasic intervals.

It is another object of this invention to provide a method of and an apparatus for continuously determining the chronodrasic interval related to the achievement of a desired objective.

It is a still further object of this invention to provide a method of and an apparatus for continuously determining the chronodrasic interval related to a particular situation and provide interactive information suitable for apprising a human operator of the need to take action and the effectiveness of the action taken.

It is a still further object of this invention to provide an apparatus for continuously determining chronodrasic intervals related to a particular situation(s) and provide control signals suitable for controlling a display that provides interactive information suitable for apprising a human operator of the need to take action and the effectiveness of the action taken or suitable for use by automatic control systems adapted to take similar action automatically.

SUMMARY OF THE INVENTION

In accordance with this invention, a method of and an apparatus for determining chronodrasic intervals is provided. The method and apparatus are based on the understanding that, in dynamic systems, the achievement of a desired objective requires that a derivative of a parameter attain a specific value before the parameter itself attains a specific value. For example, the achievement of the objective of an aircraft stopping or taking off before reaching the end of a runway requires that the velocity of the aircraft (a derivative of distance) attain a specific value (zero or rotation speed) before the runway distance remaining reduces to zero.

The method and apparatus of the invention continuously determines the limiting or boundary case based on the application of the maximum control action available. That is, the method and apparatus continuously determines the amount of the parameter required to achieve the desired objective if maximum control action is immediately taken. In addition, the method and apparatus continuously determines the total amount of the parameter remaining. Then, the chronodrasic interval is determined by deducting the parameter amount required to achieve the desired objective if maximum control action is taken from the total amount of the parameter remaining; and, dividing the result by a preselected rate of change of the parameter. The preselected rate of change can take the form of the present rate of change of the parameter or the form of the maximum rate of change of the parameter.

The value of the chronodrasic interval (preferably only if below a predetermined value) is displayed to provide interactive information adapted to apprise a human operator of the need to take control action and the effectiveness of the action taken. Alternatively, the value of the chronodrasic interval is used to automatically regulate the amount of control action taken.

It will be appreciated from the foregoing description that the invention provides a method of and an apparatus for providing chronodrasic interval information. Preferably, apparatus formed in accordance with the invention includes an electronic control system adapted to provide the chronodrasic interval information in signal form adapted to control either a display or an automatic control apparatus. In the case of a display, the display apprises the operator of the necessity to take control action and the effectiveness of the control action taken. In the case of an automatic control system, the signal forms a feedback signal that is used in a conventional manner to control the action taken. In either case, the signal is utilized to achieve the desired objective.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a line diagram used to described the theory underlying the present invention;

FIGS. 2A and 2B comprise a graph and a table, respectively, illustrating one type of situation applicable to the line diagram illustrated in FIG. 1;

FIGS. 3A and 3B comprise a graph and a table, respectively, illustrating a second type of situation applicable to the line diagram illustrated in FIG. 1;

FIGS. 4A and 4B comprise a graph and a table, respectively, illustrating another type of situation applicable to the line diagram illustrated in FIG. 1;

FIGS. 5A and 5B comprise a graph and a table, respectively, illustrating still another type of situation applicable to the line diagram illustrated in FIG. 1;

FIGS. 6A and 6B comprise a graph and a table, respectively, illustrating yet another type of situation applicable to the line diagram illustrated in FIG. 1;

FIGS. 7A and 7B comprise a graph and a table, respectively, illustrating yet still another type of situation applicable to the line diagram illustrated in FIG. 1;

FIG. 8 is a graph that is also used to illustrate the theory underlying the present invention;

FIG. 9 is a block diagram of an apparatus formed in accordance with the invention for continuously advising the pilot of a landing aircraft of the chronodrasic interval to either decelerate the aircraft to a particular velocity at a particular turnoff ramp or to stop the aircraft prior to reaching the end of the runway;

DESCRIPTION OF THE PREFERRED EMBODIMENT

Figure 10:
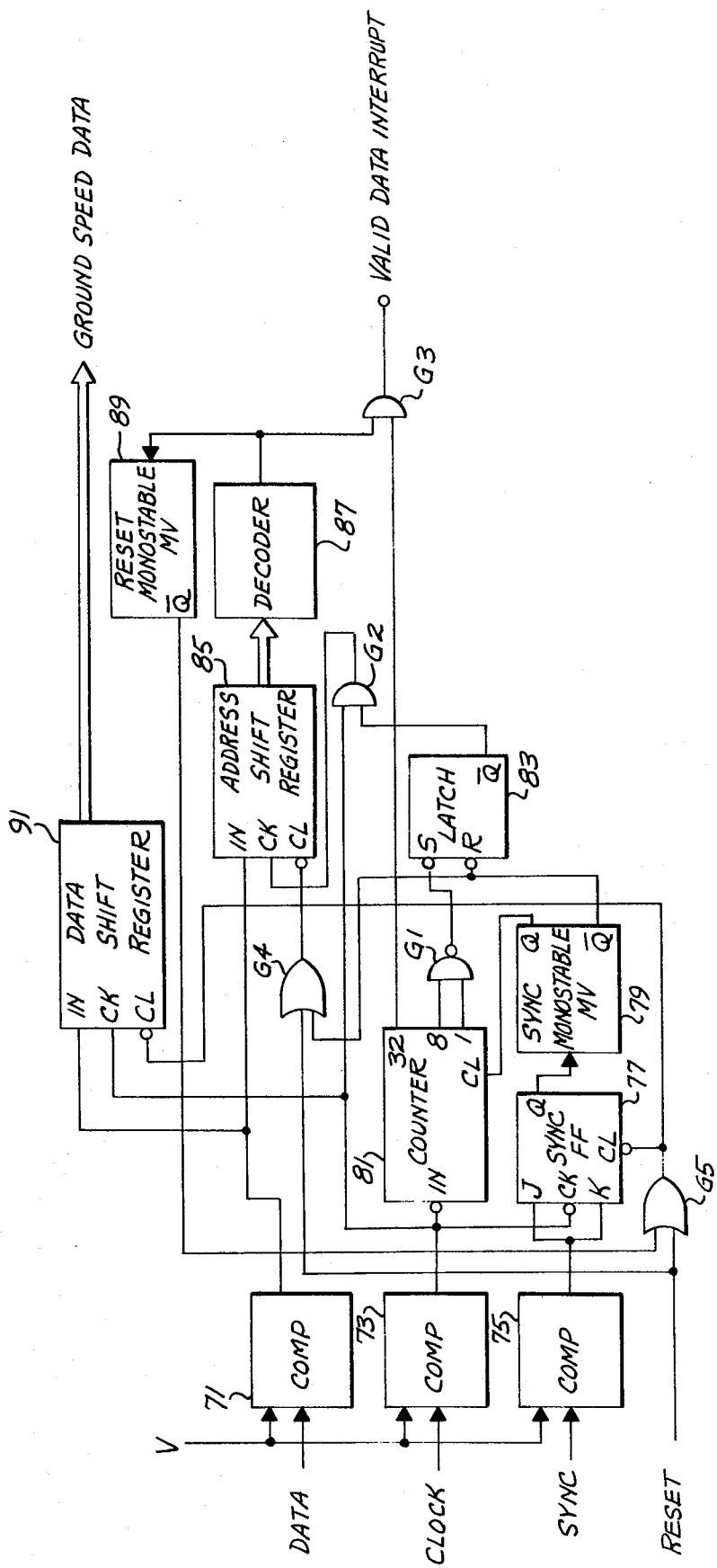
FIG. 10 is a block diagram of a system for developing the ground speed data used in the embodiment of the invention illustrated in FIG. 9.

Prior to describing in detail the method and apparatus of the invention, the theory underlying the method and apparatus is described.

The chronodrasic interval is most easily understood by considering FIG. 1, which comprises a line diagram illustrating an aircraft A on a runway R. A distance $X_0$ separates the aircraft from the end of the runway; and the aircraft is travelling toward the end of a runway at a present velocity $X'_0$. The aircraft has a braking capability such that the average maximum deceleration that can be created is generally equal to $\mu g$ where $\mu$ represents the coefficient of friction of the runway and g is the gravitational constant. To be more accurate, maximum braking is actually represented by $\mu g$, minus the idle thrust of the engines divided by the mass of the aircraft. However, it has been found that a conservative estimate of $\mu$ is adequate to eliminate the need to include the latter term in a practical system. Thus, the latter term is not included in the following analysis. In fact, the $\mu g$ term can be replaced by fixed values depending upon the general condition of the runway, e.g., icy, wet or dry. In the case of an icy runway, $\mu g$ can take on a fixed value of 2.5; in the case of a wet runway, $\mu g$ can take on a fixed value of 6; and, in the case of a dry runway $\mu g$ can take on a fixed value of 12.5. Regardless of how maximum brake action is defined, the chronodrasic interval is the time remaining for the pilot to apply maximum aircraft brake action in order to stop the aircraft by the time the end of the runway is reached.

As will be better understood from the following discussion of the theory underlying the method and apparatus of the invention, the chronodrasic interval, $I_t$, is generally defined by the following equation:

$$I_1 = \frac{PR - PAR}{PR'} \quad (1)$$

where:
PR = Amount of the parameter remaining
PAR = Amount of the parameter required to achieve the desired objective if maximum control action is applied
PR′ = A preselected rate of change of the parameter—either the present rate of change or the maximum rate of change In the braking situation illustrated in FIG. 1, PR is equal to $X_0$ (distance); and, PR′ is equal to $X'_0$ (the present rate of change of distance). As shown below, the amount of the parameter needed to achieve the desired objective (PAR) is equal to the present velocity squared [e.g., $(X'_0)^2$] divided by twice the average maximum deceleration available. As noted above, the average maximum acceleration available in a practical system can be equated to $\mu g$ (or a constant), whereby PAR is equal to $(X'_0)^2/2\ \mu g$. When the foregoing terms are substituted into equation (1), equation (1) becomes:

$$I_1 = \frac{X_0 - \frac{(X'_0)^2}{2\ \mu g}}{X'_0} \quad (2)$$

which can be reduced to:

$$I_1 = \frac{X_0}{X'_0} - \frac{X'_0}{2\ \mu g} \quad (3)$$

For purposes of discussion, it is first assumed that the distance to the end of the runway is 2000 feet, the velocity of the aircraft is 50 feet per second and the brakes can produce a maximum deceleration of 12.5 feet per second$^2$ (Dry runway). FIGS. 2A and 2B illustrate the time remaining (e.g., the chronodrasic interval) for brake application and elapsed time from the 2000 foot point, assuming the pilot takes no action, whereby the aircraft's velocity remains constant. In this case, the chronodrasic interval starts out at 38 seconds and linearly reduces to zero. It should be noted that the chronodrasic interval does not indicate when the aircraft will reach the end of the runway; rather it indicates how long the pilot has to apply maximum braking action to avoid running off the end of the runway. In this regard, as set forth on the last line of the table illustrated in FIG. 2B, the chronodrasic interval reaches zero when the distance separating the aircraft from the end of the runway is 100 feet. In other words, if the pilot applies maximum braking action prior to reaching the 100 foot separation point, he will be able to stop the aircraft before the end of the runway is reached. Contrariwise, if he applies maximum braking action after the 100 foot separation point is passed, the aircraft will not stop by the time the end of the runway is reached.

If the pilot changes the velocity of the aircraft, the chronodrasic interval will change accordingly. In this regard, FIGS. 3A and 3B illustrate a situation where it is assumed that the pilot accelerates the aircraft at the 1500 foot separation point so that when the aircraft reaches the 1000 foot separation point, its speed is 100 feet per second, rather than 50 feet per second. Obviously, as is clearly shown in FIGS. 3A and 3B, such acceleration substantially diminishes the chronodrasic interval. In fact, the chronodrasic interval changes quite rapidly during the period of acceleration between the 1500 and 1000 foot separation points; and, the increased velocity requires that maximum braking action be applied by the 400 foot separation point, rather than the 100 foot separation point, in order to avoid running off the end of the runway.

FIGS. 4A and 4B illustrate the situation wherein the pilot exhibits a more rational behaviour and applies some brake force as he reaches the 1000 foot separation point. In this regard, the speed schedule followed is illustrated in the second column of FIG. 4B. FIG. 4A graphically illustrates that with this speed schedule the chronodrasic interval does not fall below 18 seconds, even though the pilot stops only 50 feet from the end of the runway. In other words, the chronodrasic interval after dropping to 18 seconds remains around or slightly above 19 seconds due to the braking action applied (which is less than maximum available braking action) until the aircraft stops, at which time the chronodrasic interval becomes essentially infinite.

FIGS. 5A, 5B; 6A, 6B; and 7A, 7B correspond to FIGS. 2A, 2B; 3A, 3B; and, 4A, 4B, respectively, and show what occurs if the condition of the runway is such that only 2.5 feet per second$^2$ of deceleration is possible, rather than 12.5 feet per second$^2$. This could represent an icy runway where $\mu g=2.5$. In any event, FIGS. 5A, 6A and 7A include the graphical information contained in FIGS. 2A, 3A and 4A, respectively, plus a curve illustrating what occurs for a 2.5 feet per second$^2$ assumed maximum deceleration rate; and, FIGS. 5B, 6B and 7B show the same general information in table form, plus speed and distance information. It should be noted that the effect of changing brake effectiveness is not constant but depends on the speed of the aircraft. When the pilot of the aircraft applies brakes early as illustrated in FIG. 7A, the effect of a five fold reduction in braking is hardly noticeable.

FIGS. 5A, 5B; 6A, 6B; and, 7A, 7B could, for example, illustrate the situation wherein an aircraft is equipped with two sets of brakes—a main braking system and an auxiliary braking system. The figures illustrate the effect of a failure of the main braking system, assumed to have a braking capacity of 12.5 feet per second$^2$, so that the auxiliary braking system, assumed to have a braking capacity of 2.5 feet per second$^2$, is required to provide the full braking effect. Alternatively, these figures could illustrate a situation wherein the runway $\mu$ factor varies from a dry pavement to an icy pavement.

It will be appreciated from the foregoing description of the principle of chronodrasics that the chronodrasic interval is the interval during which control action can be taken to reach a desired ojective. It is not the time to a particular event occurring. Thus, the lapse of the chronodrasic interval does not occur simultaneously with the occurrence of the event, i.e., reaching the end of the runway. Rather, the lapse of the chronodrasic interval occurs simultaneously with the inability of maximum corrective action to avoid the event and, thereby, achieve the desired objective. The time interval between the end of the chronodrasic interval and the occurrence of the event is more appropriately called the chronagonic (agonizing time) interval.

It is apparent (and can be proven using Taylor's expansion theorem, if derivatives higher than the second order derivative are ignored) that the remaining distance, X, at any point in time is equal to the initial distance, $X_0$, minus the distance lost as a result of aircraft movement. Aircraft movement is definable in terms of the first derivative of distance, i.e., velocity, plus any change resulting from accelerations or decelerations, which are the second derivative of distance. More specifically, aircraft movement distance is equal to the initial velocity $X'_0$ multiplied by the interval of movement, I, plus or minus the distance gained or lost respectively, as a result of the acceleration or deceleration of the aircraft—$X''_0(I)^2/2$. In other words:

$$X = X_0 + X_0'(I) + X_0'' \frac{(I)^2}{2} \tag{4}$$

Further, as is also apparent (and also can be proven using Taylor's expansion theorem if derivatives higher than the second order derivative are ignored) that the velocity of the aircraft when point X is reached is equal to the initial velocity, $X'_0$, plus or minus any change in velocity occurring as the result of the aircraft accelerating or decelerating. In other words:

$$X' = X'_0 + X''_0(I) \tag{5}$$

In accordance with the invention, the interval I is broken into two intervals, $I_1$ and $I_2$. $I_1$ is the chronodrasic interval and $I_2$ is the interval required for the aircraft to achieve its desired objective (e.g., stopping before reaching the end of the runway) if maximum control action (e.g., braking) is applied. In essence, for the aircraft environment illustrated in FIG. 1, the invention answers the question: For the current ground speed, $X'_0$, how long can the aircraft go (the chronodrasic interval $I_1$) before maximum control action must be applied in order to achieve the desired objective? In the case of stopping, the maximum control action is maximum braking. In the case of takeoff, the maximum control action is the maximum thrust available, since reaching rotation velocity is the desired objective. (In some instances rotation velocity may be adequate, but thrust inadequate to achieve the required climb gradient, as discussed below. Further, if the aircraft is a jet aircraft, spool up-time must be taken into consideration, as also discussed below.) In any event, equations (4) and (5) can be rewritten in terms of $I_1$ and $I_2$ as follows:

$$X = X_0 + X_0'(I_1 + I_2) + X_0'' \frac{(I_1 + I_2)^2}{2} \tag{6}$$

$$X' = X'_0 + X''_0 (I_1 + I_2) \tag{7}$$

As discussed above, the invention is based on the rate of change of the parameter, in this case current ground speed, $X'_0$, remaining constant until maximum control action is applied. Maximum control action of course is the change in velocity due to deceleration (stopping) or acceleration (take-off). Since the assumption is being made that the rate of change of the parameter will remain constant during the chronodrasic interval, $I_1$, that term vanishes from the portions of equations (6) and (7) related to changes in the rate of change of the parameter (i.e., the acceleration or deceleration terms), whereby these equations respectively become:

$$X = X_0 + X_0'(I_1 + I_2) + \frac{X_0'' (I_2)^2}{2} \tag{8}$$

$$X' = X'_0 + X''_0 (I_2) \tag{9}$$

Equations (8) and (9) are the two basic equations that describe the operation of the invention. These equations not only apply to an aircraft or other vehicle moving along a runway, course or track, they apply to any type of dynamic system having a parameter related to a desired objective that can be subjected to some maximum control action to achieve the desired objective, as long as the value of the parameter, the rate of change of the parameter and changes in the rate of change of the parameter can be measured or calculated. It will be appreciated that equations (8) and (9) show that, in dynamic systems, the achievement of a desired objective (such as an aircraft stopping before reaching the end of a runway on landing or an aircraft reaching rotation speed before reaching the end of a runway on takeoff) requires that the rate of change or derivative (e.g., velocity) of a parameter (e.g., distance) attain a specific value before the parameter itself contains a specific value.

In the case of an aircraft landing, the derivative (velocity—$X'$) must equal zero before the parameter (distance—$X$) reaches zero. Thus, at the end of the runway, equations (8) and (9) must both equal zero since the objective is to have zero velocity at the end of the usable runway. Based on this understanding, a single equation can be derived for determining the value of the chronodrasic interval, $I_1$. First, the value of $I_2$ is obtained from equation (9). The result is as follows:

$$I_2 = \frac{-X_0'}{X_0''} \tag{10}$$

Substituting the value of $I_2$ in equation (8) and setting equation (8) equal to zero results in the following equation:

$$X_0 + X_0'(I_1) + X_0'\left(-\frac{X_0'}{X_0''}\right) + \frac{X_0''}{2}\left(\frac{X_0'}{X_0''}\right)^2 = 0 \tag{11}$$

Reduction and rearranging the terms of equation (9) results in the following equation being formed:

$$X_0'(I_1) = \frac{(X_0')^2}{2X_0''} - X_0 \tag{12}$$

whereby:

$$I_1 = \frac{\frac{(X_0')^2}{2X_0''} - X_0}{X_0'} \tag{13}$$

Equation (13) does not take into consideration the sign of the various components. In this regard, $X'_0$ is always a negative number since the runway length is decreasing in value. In addition, $X''_0$ is a positive number since its direction is toward increasing $X_0$. Thus, taking into consideration the signs of the terms, equation (13) is more appropriately expressed as:

$$I_1 = \frac{X_0 - \frac{(X_0')^2}{2X_0''}}{X_0'} \quad (14)$$

Equation (14) is the form of equation (2) where $X''_0 = \mu g$. thus, equation (14) is in the form of equation (1). That is, equation (14) states that the chronodrasic interval ($I_1$) is equal to the amount of the parameter remaining ($X_0$) minus the amount of the parameter required to achieve the desired objective [$(X'_0)^2/2X''_0$] divided by the rate of change of the parameter ($X'_0$). Thus, the specific case of a runway landing has been shown to follow the general form assumed at the beginning of the description of FIGS. 1–7. While equation (14) is the basic expression for this particular environment of application of the invention, equation (14) can be further simplified for computation purposes. The result is:

$$I_1 = \frac{X_0}{X_0'} - \frac{X_0'}{2X_0''} \quad (15)$$

Thus, equation (15) is the least complicated expression that defines the chronodrasic interval for an aircraft landing situation where it is desired to stop the aircraft by the time the end of the runway is reached. Obviously, a similar mathematical exercise can be performed to determine the chronodrasic interval if it is desired that the speed of the aircraft be reduced to some predetermined value (greater than zero) at some point prior to the end of the runway, such as a turnoff ramp intersection point. In this case, the chronodrasic interval formula becomes:

$$I_1 = \frac{X_{T0} - \frac{(X_0')^2 - (X_{T0}')^2}{2X_0''}}{X_0'} \quad (16)$$

where:

$X_{T0}$ is equal to the runway length to the turnoff point;
$X'_{T0}$ is equal to the desired velocity at the turnoff point;
and the other terms are the same as those previously described.

Equation (16) can be reduced to:

$$I_1 = \frac{X_{T0}}{X_0'} - \frac{X_0'}{2X_0''} + \frac{X_{T0}^2}{2X_0''X_0'} \quad (17)$$

for computation purposes.

While factors other than brakes, such as thrust reversers, can contribute to the deceleration of an aircraft, if credit is only given for the effect of the brakes, as previously discussed, the deceleration in equations (15) and (17), $X''_0$, can be replaced by $\mu g$, where $\mu$ is the coefficient of friction of the runway and $g$ is the gravitational constant. As a result, equations (15) and (17), respectively, can be changed to the following:

$$I_1 = \frac{X_0}{X_0'} - \frac{X_0'}{2\mu g} \quad (18)$$

$$I_1 = \frac{X_{T0}}{X_0'} - \frac{X_0'}{2\mu g} + \frac{X_{T0}^2}{2\mu g X_0'} \quad (19)$$

Alternatively, as also previously discussed, equations (18) and (19) can be further simplified by replacing $\mu g$ with a constant whose value is related to the general condition of the runway, i.e., dry, wet or icy.

In accordance with the invention, depending upon the desired objective (i.e., stopping before reaching the end of the runway, or reducing the velocity of the aircraft to a predetermined value at a ramp intersection), the value of the chronodrasic interval, $I_1$, is continuously determined in accordance with equations (14) or (16), or the simplified versions thereof described above. As a result, the chronodrasic interval, $I_1$, may be continuously changing if, for example, the velocity of the aircraft remains unchanged or the velocity of the aircraft is changed in a manner such that the chronodrasic interval changes. Alternatively, the braking action can be such that the chronodrasic interval remains constant as the aircraft proceeds down the runway. In any event, by continuously monitoring the value of the chronodrasic interval based on present conditions, the pilot can be made aware of the effect of any control action (e.g., brake application) he is taking. Thus, the chronodrasic interval, if suitably displayed, continuously advises the pilot of the effectiveness of the control action he is taking. Alternatively, the value of the chronodrasic interval can be used to automatically control the application of the control action, i.e., brake pressure.

As will be understood from the foregoing discussion of the principles or theory underlying the present invention, the method of the invention generally comprises the steps of: determining the amount of a parameter required to achieve a desired objective if maximum control action is taken; determining the total amount of the parameter remaining; deducting the amount of the parameter required to achieve the desired objective if maximum control action is taken from the amount of the parameter remaining; and dividing the result by a preselected rate of change of the parameter. In the case of a landing aircraft, the parameter is runway length and the preselected rate of change of the parameter is the present velocity of the aircraft. Apparatus functioning in accordance with the foregoing method for use onboard an aircraft to advise the pilot of the chronodrasic interval related to reducing aircraft velocity to a predetermined value at a ramp intersection or, if that objective is not desired or cannot be achieved, advise the pilot of the chronodrasic interval related to stopping the aircraft before reaching the end of the runway is next described.

Figure 11:
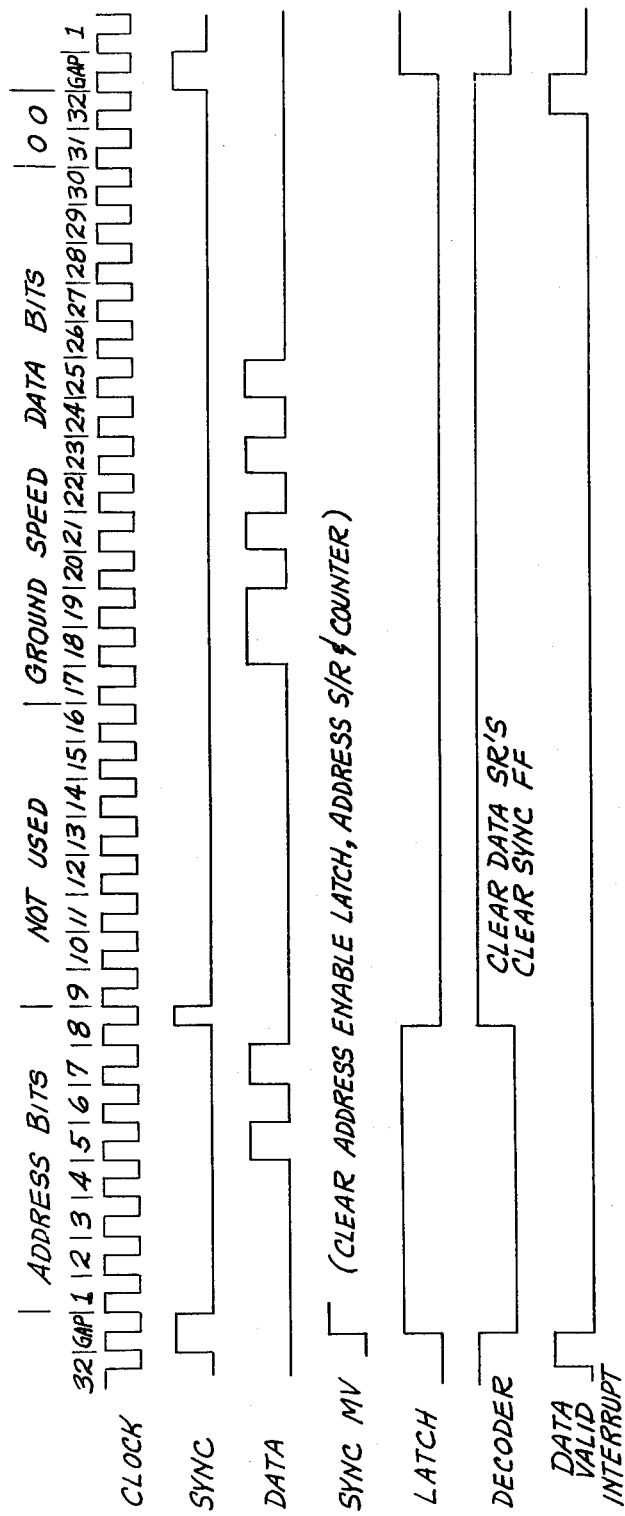
FIG. 11 is a timing diagram used to explain the operation of the system illustrated in FIG. 10.

FIG. 8 is a line diagram showing the flight path of an aircraft landing on a runway so as to have available an initial objective of reducing its velocity to a predetermined value at the location of a runway ramp, $X_{T0}$ distance from the start of the runway, and thereafter the objective of stopping the aircraft by the time the end of the runway is reached, the runway being $X_0$ feet in length. The landing flight path is illustrated as starting when the aircraft is fifty feet (50') above the start of the runway. FIG. 9 is a block diagram of a chronodrasic monitoring system formed in accordance with the invention for producing a display suitable for providing interactive information for the pilot to use in applying brake power to achieve either of the two desired objectives. The display control signals can also be used to control an automatic control system, such as an automatic brake pressure control system, if desired. FIG. 10 is a block diagram of a ground speed data subsystem suitable for providing ground speed data for use in the system illustrated in FIG. 9. FIG. 11 is a timing diagram useful in understanding the operation of the ground speed data subsystem illustrated in FIG. 10; and, FIGS. 12–16 are flow diagrams used to describe the operation of a data processor illustrated in FIG. 9, which functions in accordance with equations (18) and (19) to control the display.

The chronodrasic monitoring system illustrated in FIG. 9 comprises: runway length switches 21; runway length to turnoff switches 23; $\mu$ switches 25; turnoff speed switches 27; first, second, third and fourth input/output (I/O) interfaces 29, 31, 33 and 35 controlled by a first I/O selector 37; a 50' detector 39; a ground speed interface 41; a controller 43; a data processor 45; a clock 47; a random access memory (RAM) 49; a read only memory (ROM) 51; address buffers 53; a decoder 55; a fifth I/O interface 57 controlled by a second I/O selector 59; and a display 61.

Preferably, the runway length, runway length to turnoff, $\mu$ and turnoff speed switches 21, 23, 25 and 27 are all thumbwheel actuated switches that display decimal numbers and control related signals in binary coded decimal (BCD) form. Also, preferably, the runway length and runway length to turnoff switches 21 and 23 are five digit switches and the $\mu$ and turnoff speed switches 25 and 27 are two digit switches. The BCD outputs of the runway length, runway length to turnoff, $\mu$ and turnoff speed switches 21, 23, 25 and 27 are connected to the inputs of the first, second, third and fourth I/O interfaces 29, 31, 33 and 35, respectively.

The 50' detector 39 continuously receives altimeter data from the aircraft's altimeter. Upon reaching the 50 foot point, the voltage level of the output of the 50' detector 39 changes. This level change is detected by the controller 43 and initiates the operation of the chronodrasic monitor system. The level change is also applied to strobe inputs of the first, second, third and fourth I/O interfaces 29, 31, 33 and 35 to cause the interfaces to read and store the settings of their related switches. Further, the level change is detected by and enables the ground speed interface 41.

The first, second, third and fourth I/O interfaces 29, 31, 33 and 35 also separately receive an enabling control input from the first I/O selector 37. The outputs of the first, second, third and fourth I/O interfaces 29, 31, 33 and 35 are connected to a common data bus 63. The first I/O selector 37, of course, enables one and only one of the first, second, third and fourth I/O interfaces at a time so that one and only one of the runway length, runway length to turn off, $\mu$ and turn off speed switch data is applied to the data bus 63 at a time. In this regard, the data processor 45 produces address signals that are applied to an address bus 65. The first I/O selector 37 receives the address signals produced by the data processor 45, via the address bus. If the address on the address bus is one designed to enable one of the first-fourth I/O interfaces, the first I/O selector enables the appropriate I/O interface. As a result, the related switch setting data is applied to the data bus in BCD form.

The ground speed interface 41 receives and forwards ground speed data produced by the ground speed data subsystem illustrated in FIG. 10 and hereinafter described and applies that data to the data bus 63. In addition, the ground speed data subsystem produces a VALID DATA INTERRUPT signal that is applied to the data processor 45 when valid ground speed data is available.

The controller 43 is connected to the data bus 63 and to the data processor 45 and acts as an interface therebetween. The data processor, in addition to being connected to the controller 43, is also connected to the address bus 65, which extends to the second I/O selector 59; and, to the RAM 49 and the decoder 55 via the address buffers 53.

The RAM 49 receives memory read and write control signals from the controller 43 and is connected to the data bus 63. The decoder 55 receives the read control signal produced by the controller 43 and selected address bits; and, in accordance therewith, addresses the ROM. The ROM 51 is also connected to the data bus 63. Further, the fifth I/O interface 57 is connected between the data bus 63 and the display 61. The second I/O selector 59 produces an enable output that is applied to the enable input of the fifth I/O interface 57, when a suitable addresses is placed on the address bus 65 by the data processor 45.

In operation, prior to landing, the pilot sets the runway length switches 21 to the length of the runway ($X_0$) on which he is to land and the runway length to turnoff switches 23 to the appropriate value ($X_{T0}$). In addition, the $\mu$ switches 25 are set to the value of the runway $\mu$ factor, which is supplied by the airport and the turnoff speed switches 27 are adjusted to the desired turnoff speed ($X'_{T0}$). Alternatively, a transponder could be located at the end of the runway and used to transmit runway length, runway length to turn-off and $\mu$ data to the aircraft upon being interrogated when the aircraft reaches the 50 foot (or some other chosen altitude) point. Further, if desired, the turnoff speed could be automatically read from a memory, such data being based on the characteristics of the airfield with which the invention is being used and any other relevant criteria, such as runway $\mu$.

In any event, when the altimeter data indicates that the aircraft is 50 feet above the runway, the 50' detector applies a level change to the controller. The same level change strobes the first, second, third and fourth I/O interfaces causing them to read and store their respective switch settings. Thereafter, the controller causes the data processor to sequentially produce the addresses of the first, second, third and fourth I/O interfaces on the address bus 65. In accordance therewith, the first I/O selector 37 sequentially enables the first, second, third and fourth I/O interfaces 29, 31, 33 and 35. As a result, runway length, runway length to turnoff, $\mu$ and turnoff speed data are sequentially placed on the data bus 63. The RAM is addressed and enabled to receive and store the available data in a suitable data bin. As a result, data is transferred from the switches to the RAM at the start of the runway.

When the aircraft reaches the start of the runway, the ground speed data subsystem illustrated in FIG. 10 and hereinafter described produces ground speed data. Each time valid ground speed data becomes available, a VALID DATA INTERRUPT pulse causes the data processor to forward the available data via the controller and the data bus to the RAM by enabling the ground speed interface 41; and, then addressing the RAM so that it receives and stores the data in a suitable data bin. Constants such as 2 and g are stored in the ROM. After all necessary data has been received and stored, the data processor determines the value of the chronodrasic interval in accordance with equations (18) or (19) as hereinafter described. As needed, the stored data is readout and used. Data that changes as the aircraft proceeds down the runway, i.e., runway length (remaining) and runway length to turn-off (remaining) replaces the initial data received from the switches. After the data processor determines the value of the chronodrasic interval, the interval is applied to the data bus 63. Thereafter, the second I/O selector 59 is addressed in a manner that causes it to enable the fifth I/O interface 57, whereby the chronodrasic interval data is applied to the display, which includes a register or latches for storing this data between updates. The ROM, of course, is addressed so as to apply the desired data to the data bus, when ROM data is required by the data processor.

The clock 47 produces timing pulses, which are applied to the data processor 45. The clock 47 also produces a reset pulse that resets the data processor and the hereinafter described ground speed data subsystem when a manually operated momentary contact switch is closed. The reset pulse also is used to reset other components that require resetting, such as the I/O interfaces. For purposes of clarity of illustration, wires for carrying reset pulses to such items are not illustrated.

While the chronodrasic monitoring system illustrated in FIG. 9 can be formed of components produced by various manufacturers, by way of example only, one actual embodiment of such a system was formed of components manufactured by the Intel Corporation of Santa Clara, Calif. The I/O interfaces 29, 31, 33, 35 and 57 were formed by 8212 8-bit Input/Output Ports; the I/O selectors 37 and 59 and the decoder 55 were formed by 8205 High-Speed 1-out-of-8 Binary Decoders; the data processor 45 was formed by a 8080A Single Chip 8-bit N-Channel Microprocessors; the controller 43 was formed by a 8228 System Controller and Bus Driver for 8080A CPU; the RAM 49 was formed by plurality of 8111A 256×4-bit static RAMs; the ROM 51 was formed by a plurality of 8708 8K UV Erasable PROMs; the clock 47 was formed by a 8224 Clock Generator and Driver for 8080A CPU; and, the interface 41 was formed by 8255A Programmable Peripheral Interface.

Prior to describing how the data processor functions to produce the chronodrasic interval signal applied to the display via the data bus and the fifth I/O interface 57, the ground speed data subsystem illustrated in FIG. 10 is described. In addition to FIG. 10, attention is directed to the timing diagram illustrated in FIG. 11.

The ground speed data subsystem illustrated in FIG. 10 comprises: three comparators 71, 73 and 75; a sync flip-flop 77; a sync monostable multivibrator 79; a counter 81; a latch 83; an address shift register 85; a decoder 86; a reset monostable multivibrator 89; and, a data shift register 91. In addition, the ground speed data subsystem illustrated in FIG. 10 includes: a two-input NAND gate designated G1; two two-input AND gates designated G2 and G3; and, two-input OR gates designated G4 and G5.

The ground speed data subsystem illustrated in FIG. 10 receives serial ground speed data and timing signals from a suitable ground speed signal source meeting the ARINC (Aeronautical Radio, Incorporated) 561 standards. The serial ground speed data includes address data, which identifies the nature of the following serial data (e.g., ground speed) and the actual data. The timing signals include clock pulses and sync pulses. The clock and sync pulses and a representative ground speed data signal are illustrated on the first three lines of FIG. 11, respectively.

The ground speed data signal is applied to the first comparator 71, which compares the level of the received signal with a predetermined voltage level (V) in a conventional manner to square up the received signal and prevent noise from producing false information. Similarly, the clock and sync pulses are applied to the second and third comparators 73 and 75 where they are compared with the same predetermined voltage level (V) to perform the same functions. The serial ground speed data output of the first comparator 71 is applied to the data input of both the address shift register 85 and the data shift register 91. The clock pulse output of the second comparator 73 is applied to the clock input of the data shift register, the data input of the counter 81, the clock input of the sync flip-flop 77 and one input of G2. The sync pulse output of the third comparator 75 is applied to both the J and K inputs of the sync flip-flop 77.

The Q output of the sync flip-flop 77 is applied to the trigger input of the sync monostable multivibrator 79. The Q output of the sync monostable multivibrator 79 is applied to the clear input of the counter 81. The $\bar{Q}$ output of the sync monostable multivibrator 79 is applied to the reset input of the latch 83 and to one input of G4.

In the illustrated embodiment of the invention, the counter 81 has 1, 8 and 32 pulse count outputs that are utilized. When the counter counts one pulse, its one (1) pulse count output shifts high. Similarly, when eight pulses are counted, the eight (8) pulse count output shifts high and when 32 pulses are counted, the thirty two (32) pulse count output shifts high. The 1 and 8 pulse count outputs of the counter 81 are connected each to one input of G1. The 32 pulse count output of the counter 81 is connected to one input of G3. The output of G1 is connected to the set input of the latch 83. The $\bar{Q}$ output of the latch 83 is connected to the second input of G2 and the output of G2 is connected to the clock input of the address shift register 85. The parallel data output of the address shift register 85 is connected to the input of the decoder 87. The output of the decoder 87 is connected to the second input of G3 and to the trigger input of the reset monostable multivibrator 39. The $\bar{Q}$ output of the reset monostable multivibrator 89 is connected to one input of G5. The reset output of the data processor illustrated in FIG. 9 is connected to the second input of G5. The output of G5 is connected to the clear input of the sync flip-flop 77 and to the clear input of the data shift register 91.

Prior to describing the operation of the ground speed data subsystem illustrated in FIG. 10, it should be noted that certain of the foregoing elements are clocked and cleared on a high-to-low transition of the received signal as denoted by a small circle at the input whereas others are clocked or cleared on a low-to-high transition as denoted by the lack of a circle. In this regard, the sync flip-flop is both clocked and cleared by a high-to-low transition of the received signal at its clock and clear inputs. The counter 81 counts a pulse on a high-to-low transition and is cleared on a low-to-high transition. The latch 83 is set and reset on high-to-low transitions. The address register 85 is cleared on a high-to-low transition and clocked on a low-to-high transition. Similarly, the data shift register 91 is cleared on a high-to-low transition and clocked on a low-to-high transition.

As illustrated in FIG. 11, the clock pulses are a repeating chain of 32 bits followed by a gap which may be formed by a 33rd bit. In any event, the ground speed data subsystem is internally reset during the gap period by the reset monostable multivibrator 89 in the manner hereinafter described, or by a reset pulse produced by the data processor. For purposes of this description, as a starting point, it is assumed that the ground speed data subsystem illustrated in FIG. 10 is reset. As a result, the sync flip-flop 77 is cleared. Upon the occurrence of a sync pulse, which occurs in the gap in the clock signal, the sync flip-flop is set by the high-to-low clock pulse transition occurring in the middle of the gap. As a result, the sync monostable multivibrator 79 is triggered. Triggering the sync monostable multivibrator clears the counter 81, which is connected to the Q output of the sync monostable multivibrator. In addition, the latch 83 is reset and the address shift register 85 (via G4) is cleared by the $\bar{Q}$ output of the sync monostable multivibrator 79. When the latch 83 is reset, its $\bar{Q}$ output shifts from low to high whereby G2 is enabled. As a result, clock pulses are allowed to flow through G2 to the clock input of the address shift register 85. As the address shift register 85 is clocked, it reads the data signal present on the output of the first comparator 71. The first portion of the composite data signal identifies the following data and, thus, forms the "address" of that data. For purposes of discussion, it is assumed that the address when the following data is ground speed data is as illustrated on the left side of the third line of FIG. 11. That is, it is assumed that the ground speed data address is an eight-bit address having a binary value 01010000. The decoder 87 decodes the output of the address shift register. If the appropriate eight-bit address is received by the address shift register 85, immediately upon receipt of the last bit, the output of the decoder 87 shifts from low-to-high and triggers the reset monostable multivibrator 89; and, at the same time, enables G3.

While the address shift register 85 was receiving the address signal, the counter 81 was counting clock pulses. After receiving nine clock pulses, the 1 and 8 outputs of the counter 81 are both high whereby the output of the G1 shifts from high-to-low. When the output of G1 shifts from high-to-low, the latch 83 is reset. Consequently, G2 is disabled. As a result, the address shift register 85 no longer receives data bits. Rather the address shift register holds the address previously received, whereby the output of the decoder 87 remains high and G3 remains enabled.

While the address shift register was receiving the address bits, the data shift register was also receiving the address bit. However, the address bits are cleared from the data shift register when the reset monostable multivibrator 89 is triggered by the output of the decoder 87 shifting from low-to-high. More specifically, triggering the reset monostable multivibrator 89 clears the sync flip-flop 77 and the data shift register 91 via G5. The data shift register 91 now starts to receive and store data bits related to ground speed. This data is contained in the next 24 bits. (While the ground speed data is contained in these bits, only bits 17 through 30 actually contain ground speed data, as shown in FIG. 11.) At the end of the total 32 bit count cycle, the 32-bit output of the counter 81 shifts from low to high. As a result, both inputs of G3 are high, whereby a valid data interrupt pulse, which occurs on the output of G3, is forwarded to the data processor. The valid data interrupt signal causes the chronodrasic monitoring system illustrated in FIG. 9 to receive and store the ground speed data on the output of the data shift register 91 in the manner previously described. Thereafter, the cycle of operation of the ground speed data subsystem illustrated in FIG. 10 repeats.

It will be appreciated from the foregoing discussion that the ground speed data is continuously converted from the serial form in which it is received into parallel form suitable for use by the chronodrasic monitoring system illustrated in FIG. 9. In an embodiment of the invention utilizing a ground speed data source complying with the ARINC 561 standards, a valid data interrupt will occur at 50 millisecond intervals, since ground speed data is produced at 50 millisecond intervals by such a ground speed data source.

Figure 12:
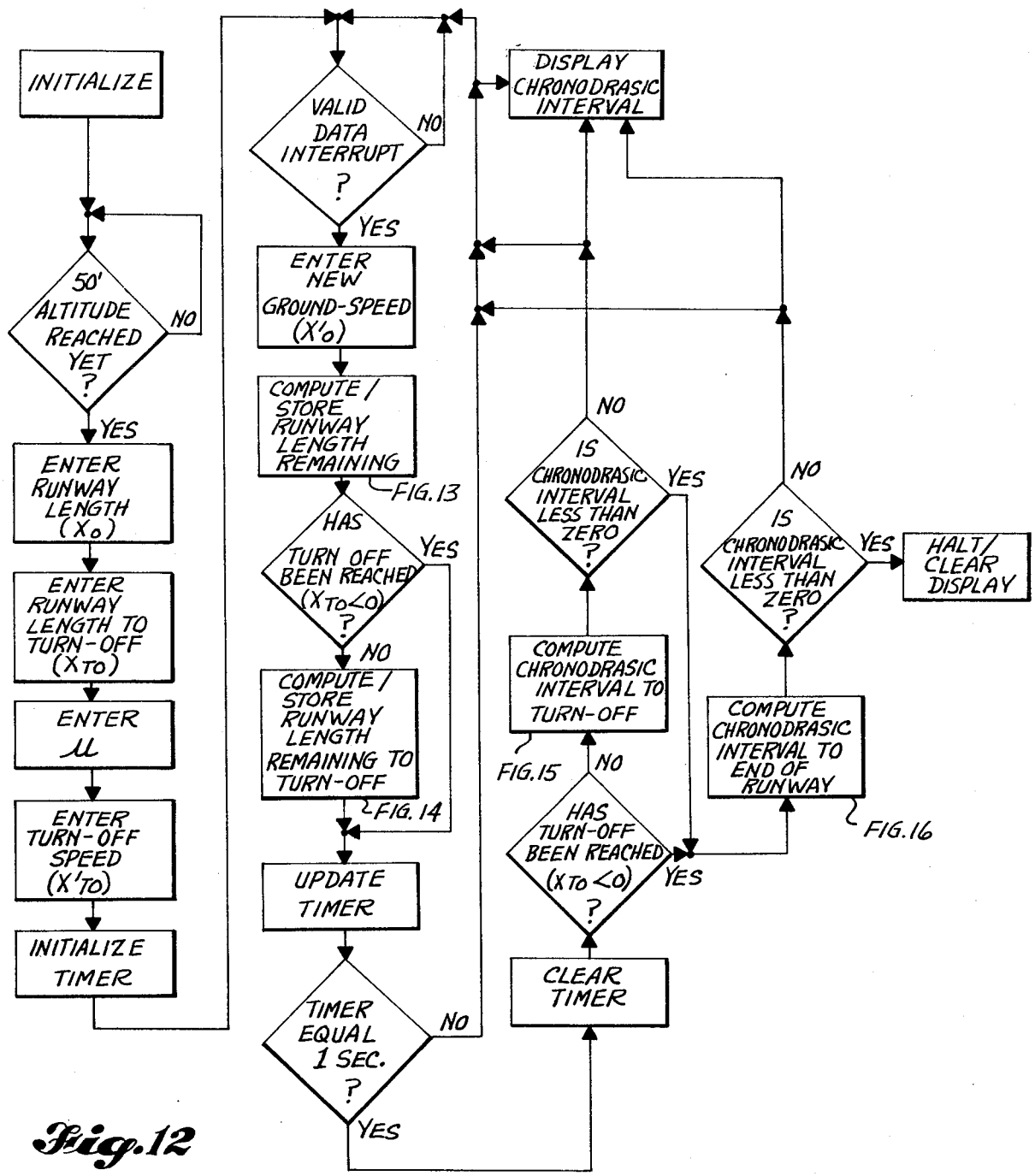
FIG. 12 is a master flow diagram illustrating the operation of the data processor illustrated in FIG. 9.

FIG. 12 is a flow diagram illustrating the operation of the data processor illustrated in FIG. 9. After being initialized, i.e., turned on, the data processor cycles asking the question: "Has the 50 foot altitude point been reached yet?"

When the 50 foot point is reached, as previously discussed, the 50′ detector 39 produces a pulse. When this pulse is received and, thus, the foregoing question is answered in the affirmative, the data processor proceeds to the next steps illustrated in FIG. 12. These are switch data loading steps. First the runway length switch data $(X_0)$ is read and stored in a suitable bin in the RAM. Next, the runway length to turnoff switch data $(X_{T0})$ is read and stored in a suitable bin in the RAM. Next, the $\mu$ switch data is read and stored in a suitable bin in the RAM. Finally, the turnoff speed switch data $(X'_{T0})$ is read and stored in a suitable bin in the RAM. Obviously the order of reading and storing can change, as desired. After the switch data has been stored in memory, a timer is initialized. The timer is utilized by the data processor so that the display is only updated at one (1) second intervals, as will be better understood from the following discussion.

Figure 13:
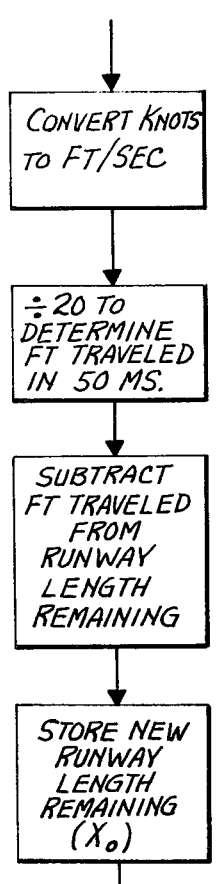
FIGS. 13, 14, 15 and 16 are enlarged flow diagrams of portions of the master flow diagram illustrated in FIG. 12.

After the switch data has been entered and stored, the data processor idles until a VALID DATA INTERRUPT pulse is received from the ground speed data subsystem illustrated in FIG. 10 and previously described. In this regard, the data processor asks the question: "Has a valid data interrupt been received?" Upon the receipt of VALID DATA INTERRUPT pulses, the initial (or thereafter new) ground speed data produced by the ground speed data subsystem is read and stored in a suitable bin in the RAM as previously described. Next, the runway length remaining is computed, using the data stored in the RAM and the ROM, and the result stored. More specifically, the runway length covered between valid data interrupt pulses is determined and the result is subtracted from the previous runway length remaining data (which originally was the runway length data read from the runway length switch) to provide new runway length remaining data, which is stored in the same bin as the previous runway length remaining data. The preferred way of accomplishing this result is illustrated in FIG. 13. In this regard, the ground speed signal, which is knots, is first converted to feet per second. The results of the conversion is divided by 20 to determine the feet travelled in 50 milliseconds. (Obviously, if the interrupt interval is other than 50 milliseconds, a factor other than 20 must be utilized to determine the feet travelled during the interrupt interval.) The feet travelled is then subtracted from the previous value of the runway length remaining data (present $X_0$) to produce the new runway length remaining data. Then, the new runway length remaining data (new $X_0$) is stored in the RAM.

Figure 14:
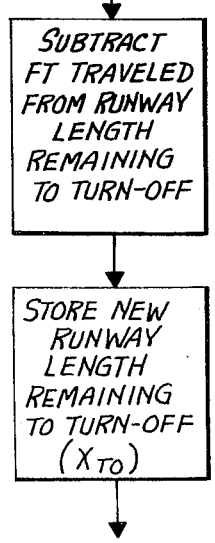

After the new runway length remaining data has been determined, the data processor determines whether or not the runway turnoff point (e.g., ramp) has been reached by asking the question "Is $X_{TO}$ less than 0?" (As will be better understood from the following discussion, the updated value of $X_{TO}$ is calculated subsequent to this question being asked). If the runway turnoff point has not been reached, new runway length remaining to turnoff data is determined and stored. If the runway turnoff point has been reached, the step of determining new runway length to turnoff data is bypassed. As illustrated in FIG. 14, the new runway length to turnoff data is determined by subtracting the feet travelled from the previous value of the runway length remaining to turnoff data (present $X_{TO}$) and then storing the remainder, which is the new runway length remaining to turnoff data (new $X_{TO}$).

As illustrated in FIG. 12, the next step in the sequence is to update the timer and then to determine whether the value of the timer value is equal to one second. If the timer value is not equal to one second, the data processor cycles back to the valid data interrupt question and continues to receive new ground speed data and based thereon determine new runway length remaining data, and runway length remaining to turnoff data.

Figure 15:
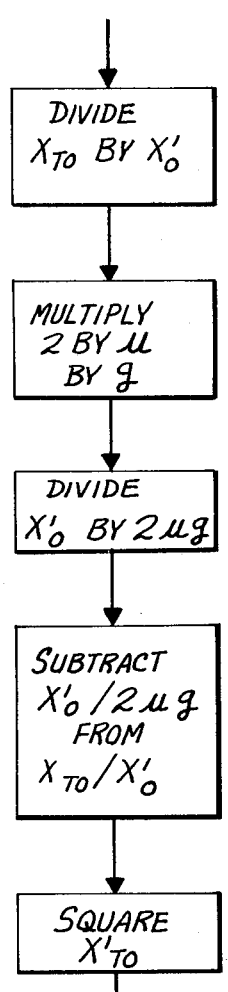

If the timer value equals one second, the timer is cleared, i.e., reset to zero. Then, a determination is again made as to whether or not the turnoff point has been reached by again asking the question whether the new value of $X_{TO}$ is less than 0. If the new value of $X_{TO}$ is greater than 0, the chronodrasic interval to the turnoff point is determined using equation (19). In this regard, as illustrated in FIG. 15, first the value of $X_{TO}$ is divided by the value of $X'_0$ and then the value of $\mu$ is multiplied by g and by 2. Next, the value of $X'_0$ is divided by 2 $\mu$g. Then the value of $X'_0/2$ $\mu$g is subtracted from $X_{TO}/X'_0$. Next, the value of $X'_{TO}$ is squared and divided by 2 $\mu$g. The result of this division is divided by $X'_0$. Then the value of $(X'_{TO})^2/2$ $\mu$g $X'_0$ is added to $[X_{TO}/X'_0 - X'_0/2$ $\mu$g$]$. The final result is the chronodrasic interval related to achieving the correct speed $(X'_{TO})$ at the turnoff ramp.

Figure 16:
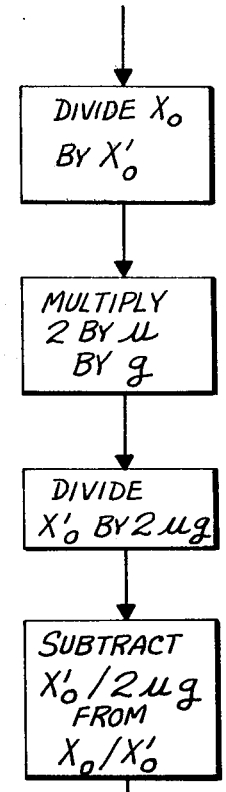

Next, the data processor determines whether or not the just determined chronodrasic interval related to achieving the correct speed is less than 0. If the chronodrasic interval related to achieving the correct speed by the turnoff point is not less than 0, it is displayed. If the chronodrasic interval is less than 0, then the data processor determines the chronodrasic interval to the end of the runway. As illustrated in FIG. 16, the chronodrasic interval related to stopping by the end of the runway is determined in accordance with equation (18). In this regard, first the value of $X_0$ is divided by the value of $X'_0$ and, then, the value of $\mu$ is multiplied by 2 and by the value of g. Next, the value of $X'_0$ is divided by the value of 2 $\mu$g. Finally, the value of $X'_0/2$ $\Xi$g is subtracted from the value of $X_0/X'_0$. The result is the chronodrasic interval related to stopping by the end of the runway.

Next, the data processor determines whether or not the chronodrasic interval related to stopping by the end of the runway is less than 0. If this chronodrasic interval is not less than 0, it is displayed. If this chronodrasic interval is less than 0, the operation of the data processor is halted and the display is cleared.

After creating a display when either of the chronodrasic intervals is not less than 0, the data processor recycles and waits for another valid data interrupt. Thereafter the sequence previously described is repeated. Previous displays are maintained until the timer equals one second, i.e., the display is only updated at one (1) second intervals, even though the runway length remaining and runway length remaining to turnoff data values are determined at 50 millisecond intervals.

It will be appreciated from the foregoing description that the data processor merely receives information in the manner previously described and, in accordance with either equation (18) or (19), determines the relevant chronodrasic interval. In this regard, preferably the display includes some type of character denoting whether or not the chronodrasic interval being displayed is the chronodrasic interval related to the turnoff point or the chronodrasic interval related to the end of the runway. Still further, preferably, a chronodrasic interval is only displayed if one of the denoted types has a value below some predetermined level, e.g., thirty (30) seconds, in order to avoid creating an unnecessary pilot distraction.

The chronodrasic interval monitoring system illustrated in FIGS. 9-16, as previously described, is only adapted to produce a chronodrasic interval display during a landing and only a display showing ramp turnoff or end of runway stopping chronodrasic intervals. However, the application of the invention to aircraft situations is much broader in that it can be used to produce a chronodrasic interval display while the aircraft is airborne above 50 feet or a display that is useful during takeoff. Further, when a pilot has the option to either stop or go, e.g., takeoff, both types of displays can be provided.

In the airborne landing situation, the chronodrasic interval to be displayed is obtained by simply decreasing the calculated value by the time it takes the aircraft to drop from its present altitude to the runway. That is, the chronodrasic interval is decreased by the time to runway value ($t_r$). $t_r$ is determined in accordance with the following equation:

$$t_r = \frac{H_R}{H'_{NOM}} \quad (20)$$

where: $H_R$ is equal to the height of the aircraft above the runway; and, $H'_{NOM}$ is equal to the sink rate associated with the nominal flight path angle.

The reasons for choosing the sink rate associated with the nominal flight path angle as opposed to the current sink rate are two-fold. First, the use of the current sink rate results in a very unstable display. Second, the use of the sink rate associated with the nominal flight data angle provides important auxiliary glide slope information. If the aircraft is on glide slope, then, for every second "lost" in stopping time, a second is "gained" in the time to the runway. Conversely, any other sink rate will yield a changing clock. Although the relative constancy of the chronodrasic interval displayed does not necessarily imply that the aircraft is on the glide slope, it does suggest that the aircraft is on a path parallel to the glide slope. Further, the mere fact that a chronodrasic interval is being displayed means that the aircraft will neither land short of the runway nor too long to effect a stop by the end of the runway (or the turnoff, if the turnoff chronodrasic interval is being displayed).

One more point should be noted with respect to the landing. As discussed above, no credit is being given for the use of thrust reversers in a jet aircraft. However, it should be noted that the effect of thrust reversers will be seen in the behavior of the displayed chronodrasic interval. If the thrust reversers of the aircraft are deployed, the displayed interval will slow at a rate less than the real time rate since the reversers will cause a reduction in velocity. This means that in reality a pilot can hold a safe stopping margin with a mix of thrust reversers and brakes because he will be continuously apprised of the effectiveness of the mix by observing changes in the chronodrasic interval being displayed.

Turning now to takeoff situations, in the takeoff case, the chronodrasic interval answers the question "For the current airspeed, how much longer can the aircraft go before the pilot must fully advance the throttles to achieve rotation speed by the end of the runway and, subsequently, achieve the minimum required climb gradient?". In other words, there are two conditions that must be met prior to reaching the end of the runway. First, the speed of the aircraft must be adequate for takeoff. Second, the thrust must be adequate to achieve the minimum climb gradient required. If either of these conditions remain unmet by the end of the runway, the desired objective of a successful, normal takeoff will not be met.

Obviously, if both of the foregoing conditions are met, the chronodrasic interval becomes infinite and provides only the information that the aircraft can takeoff. Thus, the transition from a relatively small chronodrasic interval display to an essentially infinite chronodrasic display advises the pilot that the conditions for flight have been achieved.

If the aircraft has reached rotation speed, but thrust is below minimum climb gradient requirements, the equation for determining the takeoff chronodrasic interval is straight forward:

$$X_0 + X'_0 I_1 + tsp(TH_0) = 0 \qquad (21)$$

where: $tsp(TH_0)$ is equal to the spool-up time necessary to raise the thrust from the present thrust level to the thrust level necessary to achieve the minimum acceptable climb gradient. As a result, the chronodrasic interval is equal to:

$$I_1 = -\frac{X_0}{X_0'} - tsp(TH_0) \qquad (22)$$

As before, $X'_0$ is actually a negative number whereby equation (22) becomes:

$$I_1 = \frac{X_0}{X_0'} - tsp(TH_0) \qquad (23)$$

As will be readily understood from observing equation (23), equation (23) is a simplified version of the general equation of the invention set forth in equation (1). That is, equation (23) is a simplified form of the equation:

$$I_1 = \frac{X_0 - tsp(TH_0)X_0'}{X_0'} \qquad (24)$$

In any event, equation (23) means that the chronodrasic interval is equal to the total time available to cover the remainder of the runway [determined by the remaining distance ($X_0$), divided by the present velocity ($X'_0$)] minus the time it takes for the engine to spool up from the present thrust level to the required thrust level. Equation (24) is the same as equation (23), expressed differently. Specifically, equation (24) states that the distance covered during the engine spool up time is first deducted from the remaining distance and the result is converted into the time domain by dividing by the velocity of the aircraft. Obviously programming a data processor, connected to receive suitable thrust information, to perform in accordance with either equation (23) or (24) is straightforward.

Figure 17:
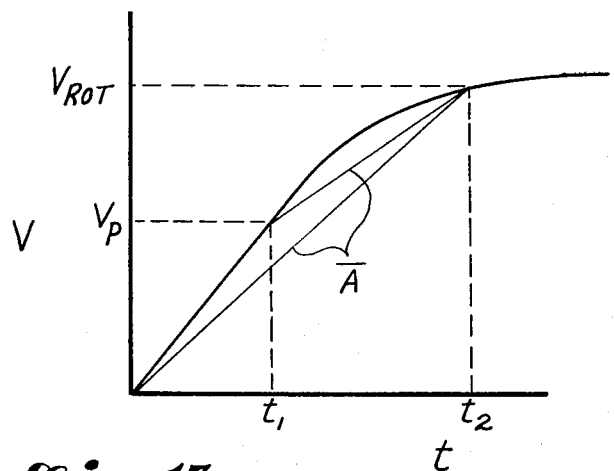
FIG. 17 is a graph denoting airspeed vs. time and is used to illustrate how average mean acceleration (A) is determined for use by one embodiment of the invention.

A third takeoff situation is one wherein the aircraft velocity is below rotation speed ($V_{ROT}$). The equation for determining the chronodrasic interval in this situation starts with basic equations (8) and (9). In this case, the acceleration of the aircraft during the $I_2$ interval can be set equal $\overline{A}$, which is the mean acceleration in terms of $X'$, given the condition that full thrust is to be applied for a change in velocity from the current airspeed to the rotational airspeed, $V_{ROT}$. This figure is readily determined from a table following a conventional table lookup procedure and, thus, can be stored in the memory (ROM) of a data processor in tabular form. FIG. 17 is a graph representing the information stored in tabular form in the ROM. The graph has airspeed plotted on the vertical axis and time plotted on the horizontal axis. The value of $\overline{A}$ is determined by differentiating velocity with respect to time, based on the present velocity. More specifically:

$$\overline{A} = \frac{V_{ROT} - V_P}{t_2 - t_1} \qquad 25)$$

where:
$V_{ROT}$ is rotational airspeed
$V_P$ is present airspeed
$t_1$ is time rotational airspeed will be reached
$t_2$ is present time Replacing $X''_0$ with $\overline{A}$ in equations (8) and (9) results in the following equations being formed:

$$X = X_0 + X_0'(I_1 + I_2) + \frac{\overline{A}(I_2)^2}{2} \qquad 26)$$

$$X' = X'_0 + A(I_2) \qquad 27)$$

The conditions that must be met, of course, are that the aircraft's velocity, $X'$, must equal the required rotational speed, $X'_R$ ($V_{ROT}$ in terms of $X'$) prior to the end of the runway being reached, i.e., prior to $X=0$. As a result, equations (26) and (27), respectively, can be written as follows:

$$X_0 + X_0'(I_1 + I_2) + \frac{\overline{A}(I_2)^2}{2} = 0 \qquad 28)$$

$$X'_0 + A\, I_2 = X'_R \qquad 29)$$

From equation (29), the value of $I_2$ can be determined as follows:

$$I_2 = \frac{X_R' - X_0'}{\overline{A}} \tag{30}$$

Substituting equation (30) in equation (28), then cancelling and rearranging terms, results in the following equation:

$$I_1 = \frac{\frac{(X_0')^2 - (X_R')^2}{2\overline{A}} - X_0}{X_0'} \tag{31}$$

As noted above $X'_0$ is actually a negative number, whereby equation (31) becomes:

$$I_1 = \frac{X_0 - \frac{(X_0')^2 - (X_R')^2}{2\overline{A}}}{X_0'} \tag{32}$$

As will be readily appreciated, equation (32) is in the form of general equation (1) set forth above. Equation (32) can be simplified to form the following equation:

$$I_1 = \frac{X_0}{X_0'} + \frac{X_0'}{2\overline{A}} - \frac{(X_R')^2}{2\overline{A}X_0'} \tag{33}$$

Equations (32) and (33) are identical. In equation (32), the numerator is in the distance domain and the result is placed in the time domain by dividing the distance value by the velocity of the aircraft. In equation (33), each term is in the time domain. Equation (33) is preferred to equation (32) only because the number of calculation steps is less. Equation (33) assumes that no additional spool-up time is required. If additional spool-up time is required, the time required is merely subtracted from the chronodrasic interval determined in equation (33), whereby equation (33) becomes:

$$I_1 = \frac{X_0}{X_0'} + \frac{X_0'}{2\overline{A}} - \frac{(X_R')^2}{2\overline{A}X_0'} - tsp(TH_0) \tag{34}$$

Again, equations (33) and (34), whichever is required, are relatively easy to implement using a digital data processor. In this regard, $X_0$ and $X'_0$ can be determined in the manner previously described. $X'_R$ is, of course, a known value of the aircraft. $\overline{A}$ can be stored in tabular form in memory since it depends upon the present velocity $X'_0$ and the required velocity $X'_R$. Spool-up time also can be stored in tabular form since spool-up time is based on the present thrust (which can be determined by engine instruments) and required thrust (which can be inserted by the pilot via a thumbwheel switch).

While the foregoing take-off situation equations produce an accurate chronodrasic interval, $I_1$, it is produced such that a display of the interval cannot be stopped from diminishing as real time advances. This result is a disadvantage. More specifically, in the braking situation, the pilot can pressure the brakes of the aircraft in such a manner that the chronodrasic interval display remains constant. (This is accomplished by reducing brake pressure as the aircraft slows down.) The constant interval display allows the pilot to see the beneficial effect of his action and, thus, "comforts" the pilot. A changing display has less of a comforting effect, even though the rate of change drops as corrective action is taken, which is what occurs in a system based on the foregoing take-off equations. This result is readily proven by differentiating $I_1$ with respect to time and setting the result equal to zero. More specifically, equation (33) can be converted to the form:

$$I_1 = \frac{X_0}{X_0'} - \frac{(X_R')^2 - (X_0')^2}{2\overline{A}X_0} \tag{35}$$

Differentiating $I_1$ with respect to time produces the following equation:

$$\frac{dI_1}{dt} = \frac{X_0' \frac{dX_0}{dt} - X_0 \frac{dX_0'}{dt}}{(X_0')^2} + \left[\frac{(X_R')^2}{2\overline{A}(X_0')^2} + \frac{1}{2\overline{A}}\right] \frac{dX_0'}{dt} \tag{36}$$

Since $(dX_0/dt) = -X'_0$ this value can be substituted into equation (36) and the terms rearranged to develop the following equation:

$$\frac{dI_1}{dt} = -1 - \left[\frac{X_0}{(X_0')^2} - \frac{1}{2\overline{A}} - \frac{(X_R')^2}{2\overline{A}(X_0')^2}\right] \frac{dX_0'}{dt} \tag{37}$$

From equation (35) it is apparent that:

$$\frac{X_0}{(X_0')^2} = \frac{I_1}{X_0'} + \frac{(X_R')^2 - (X_0')^2}{2\overline{A}(X_0')^2} \tag{38}$$

which can be substituted into equation (37) to develop the following equation:

$$\frac{dI_1}{dt} = -1 - \tag{39}$$

$$\left[\frac{I_1}{X_0'} + \frac{(X_R')^2 - (X_0')^2}{2\overline{A}(X_0')^2} - \frac{(X_R')^2}{2\overline{A}(X_0')^2} - \frac{1}{2\overline{A}}\right] \frac{dX_0'}{dt}$$

which can be reduced to:

$$\frac{dI_1}{dt} = -1 - \left[\frac{I_1}{X_0'} - \frac{1}{\overline{A}}\right] \frac{dX_0'}{dt} \tag{40}$$

If $dI_1/dt$ is now set equal to zero (required for an unchanging chronodrasic interval display) and the terms rearranged the following equation is developed:

$$\frac{dX_0'}{dt} = \overline{A}\left[\frac{X_0'}{X_0' - \overline{A}I_1}\right] \tag{41}$$

$(dX'_0/dt)$ is, of course, the acceleration required to create an unchanging display. However, since the term $$\frac{X_0'}{X_0' - \overline{A}I_1}$$

is greater than one (1) for all values of $X'_0$, $\overline{A}$ and $I_1$ greater than zero and since $\overline{A}$ is the maximum available acceleration it is apparent that it is not possible to create an unchanging display.

Another, somewhat less important disadvantage of the way the chronodrasic interval is developed using equations (33) or (34) is that an infinite interval value is developed when the aircraft is standing still, i.e., when $X'_0=0, I_1=\infty$.

In order to avoid the foregoing disadvantage, in accordance with the invention, an alternative method of determining the chronodrasic interval is provided. In this method the chronodrasic interval answers the question: "If full thrust is immediately applied what time interval will exist between the time when: (1) rotation speed is reached; and (2) the place where rotation must occur if a safe takeoff is to take place?" In other words, rather than assuming that the present speed, $X'_0$, will remain constant, this method of determining the chronodrasic interval assumes that the aircraft will be promptly accelerated to rotational speed, $X'_R$, and that the rotational speed will be maintained until the place where rotation must occur if a safe takeoff is to take place. In most instances, the latter place will be the end of the runway.

As before, the maximum acceleration is defined as $\bar{A}$ and is determined in accordance with equation (25). While derived equations (26) and (27) retain the form shown, one change occurs. Specifically, the $X'_0$ expression in the second term of equation (26) changes to a $X_R'$ expression. This result occurs because of the assumption that the aircraft is to be immediately accelerated to rotation speed ($X_R'$) rather than remaining at its present speed ($X'_0$). Thus, the two starting equations are:

$$X_R = X_0 + X_R'(I_1 + I_2) + \frac{\bar{A}(I_2)^2}{2} \quad (42)$$

$$X'_R = X_0' + \bar{A} I_2 \quad (43)$$

At the rotation point $X_R=0$, whereby equation (42) can be rewritten as:

$$X_0 + X_R'(I_1 + I_2) + \frac{\bar{A}(I_2)^2}{\bar{A}} = 0 \quad (44)$$

From equation (43) the value of $I_2$ is determined to be:

$$I_2 = \frac{X_R' - X_0'}{\bar{A}} \quad (45)$$

Substituting equation (45) into equation (44), then cancelling and rearranging terms in the following equation being produced:

$$X_1 = \frac{X_0 - \frac{(X_R')^2 - (X_0')^2}{2\bar{A}}}{X_R'} \quad (46)$$

which can be simplified to:

$$I_1 = \frac{X_0}{X_R'} - \frac{(X_R')^2 - (X_0')^2}{2\bar{A}X_R'} \quad (47)$$

Differentiating $I_1$ with respect to time ($X'_R$ is a constant, $X_0$ and $X_0'$ are variables) produces the following equation:

$$\frac{dI_1}{dt} = \frac{1}{X_R'} \frac{dX_0}{dt} + \frac{2X_0'}{2\bar{A}X_R'} \frac{dX_0'}{dt} \quad (48)$$

Since $(dX_0/dt)$ equals $-X'_0$ equation (48) can be reduced to:

$$\frac{dI_1}{dt} = \frac{X_0'}{X_R'} + \frac{X_0'}{2\bar{A}X_R'} \frac{dX_0'}{dt} \quad (49)$$

Setting $(dI_1/dt)=0$ and cancelling and rearranging terms produces the following equation:

$$\frac{dX_0'}{dt} = \bar{A} \quad (50)$$

which indicates that the maximum interval display will stop when the aircraft is being accelerated at maximum mean acceleration $\bar{A}$.

Further, from equation (47), when $X_0'$ is set equal to zero (0), i.e., the aircraft is stationary, a finite rather than an infinite chronodrasic interval value is produced. More specifically, when $X'_0$ is set equal to zero (0) equation (47) changes to:

$$I_1 = \frac{X_0}{X_R'} - \frac{X_R'}{2\bar{A}} \quad (51)$$

which is equal to a finite value since $X_0$, $X'_R$ and $\bar{A}$ are all constants.

The invention also can be used to produce a chronodrasic interval display of the time to take action to avoid terrain (e.g., the ground) when a situation occurs requiring a terrain avoidance maneuver, such as loss of lift resulting from a change in airspeed, for example. While terrain avoidance maneuvers most often occur when an aircraft is making a landing approach, they can occur during other stages of a flight, particularly during low level flights. Terrain avoidance maneuvers are required when the aircraft flight path deviates such that a risk of impact occurs. Such flight path deviations arise from pilot inattention or loss of lift. Loss of lift may result from a loss of airspeed, whereby the aircraft loses altitude at an uncontrolled rate. A change in wind velocity or direction can create such a loss in airspeed. In any event, a sudden loss of lift can create a situation where a safe landing cannot occur, whereby the pilot is required to implement a terrain avoidance maneuver. The computations necessary to provide a display adapted to assist a pilot in performing a terrain avoidance maneuver are next described.

Figure 18:
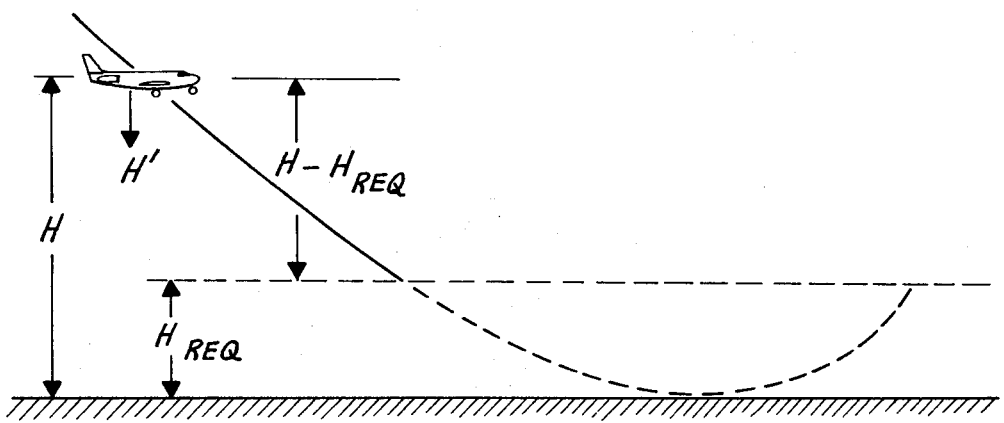
FIG. 18 is a line diagram illustrating the application of the invention to a terrain avoidance maneuver.

FIG. 18 illustrates a terrain avoidance maneuver situation. More specifically, FIG. 18 illustrates an aircraft flying at an altitude H above the ground. The altitude needed to complete a terrain avoidance maneuver based on the present condition of the aircraft considering only the major factors affecting lift (gross weight, flap setting, present airspeed and thrust) is denoted $H_{REQ}$. The present rate at which altitude is being lost is denoted $H'$.

In accordance with general equation (1), the chronodrasic interval $I_1$, can be defined as follows:

$$I_1 = \frac{H - H_{REQ}}{H'} \qquad (52)$$

The value of H is readily available from the altimeter of the aircraft; and, H' is either available or can be readily determined by differentiating H with respect to time. Hence, $H_{REQ}$ is the critical factor to be determined. The problem is that $H_{REQ}$ is dependent upon a number of factors, the major ones of which are listed above. Moreover, the relationships between these factors vary from aircraft type to aircraft type. In fact, they vary from aircraft to aircraft, even through such variations are relatively small and do not need to be considered in a practical implementation of the present invention.

Figure 19:
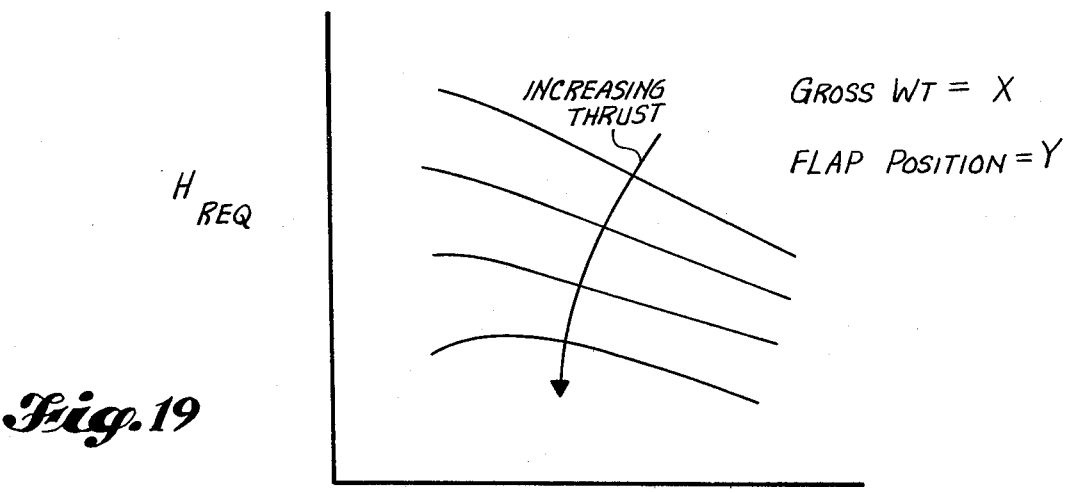
FIG. 19 is a graph used to assist in describing a terrain avoidance embodiment of the invention.

While $H_{REQ}$, which is the equivalent of the PAR factor in equation (1), is not as easy to determine as the equivalent factor was determined in the previously described embodiments of the invention, practical values of $H_{REQ}$ can be determined. More specifically, the factors affecting lift in an aircraft are all interrelated. As a result, tables can be developed interrelating these factors. There are two ways of developing such tables. The most common way presently utilized by aircraft manufacturers is to develop a computer model of the aircraft and "fly" the aircraft for varying sets of conditions. The result is a series of tables that interrelate the various factors relating to lift for a particular type of aircraft. An alternative way of developing the tables is to physically fly the particular aircraft and develop the tables. In this regard, if only the four major factors affecting lift above are considered, three of the factors can be adjusted to a predetermined value and the aircraft flown with the fourth value being varied. A set of tables can be developed for these variations. Thereafter, one of the other factors is varied by an incremental amount and the aircraft flown again, varying the fourth factor. The end result is a multitude of tables, each of which, in essence, defines a graphical relationship between two of the factors. Regardless of how developed, the tabular information can be stored in a computer memory for readout, as required. In this regard, attention is directed to FIG. 19, which illustrates one set of tables, expressed in graphical form. More specifically, FIG. 19 illustrates the relationship between indicated airspeed (IAS), thrust and $H_{REQ}$ for a particular gross weight and flap position. For a different gross weight and/or different flap position, of course, the graph would be different. In any event, a table defining curves of the type illustrates in FIG. 19 can be developed. Then, knowing the thrust and the indicated airspeed of the aircraft, the value of $H_{REQ}$ can be determined.

Figure 20:
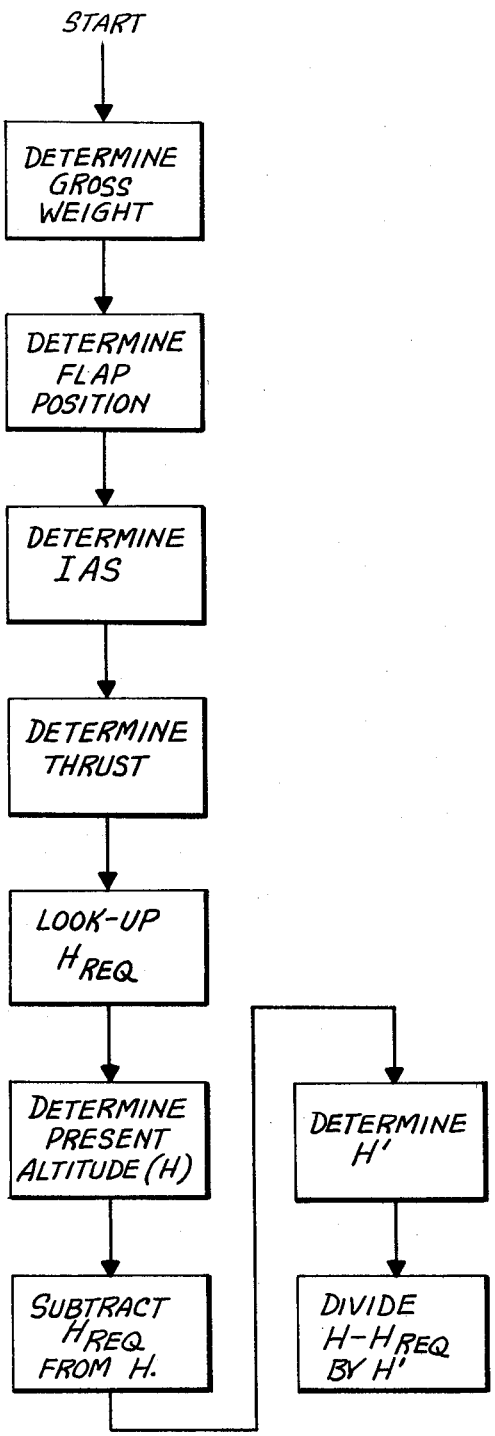
FIG. 20 is a flow diagram illustrating the operation of a terrain avoidance maneuver embodiment of the invention; and, FIG. 21 is a pictorial diagram of a display suitable for use in apparatus formed in accordance with the invention.

FIG. 20 is a flow diagram illustrating one sequence of steps usable in determining the chronodrasic interval for a terrain avoidance maneuver. First, the gross weight of the aircraft is determined. As will be readily understood by those in the aircraft art, gross aircraft weight can be readily determined by subtracting the amount of fuel consumed during a flight from the original gross weight of the aircraft at takeoff. Next, the flap position is determined by a suitable monitor monitoring the flap position indicator of the aircraft. Both leading edge and trailing edge flap positions can be included, if the aircraft includes both leading and trailing edge flaps. Next, the indicated airspeed of the aircraft is determined by electronically reading the IAS indicator. Thereafter, the thrust of the aircraft is determined. Thrust can be determined directly from the engine pressure ratio (EPR) indicators of the aircraft. After all four factors have been determined, the value of $H_{REQ}$ is looked up in the memory system storing the tabular relationships between these factors.

After the value of $H_{REQ}$ has been looked up, the present altitude is determined by reading the altimeter of the aircraft. Next, the value of $H_{REQ}$ is substracted from the altimeter value, H. Then the value of H' is determined by either a suitable vertical measuring instrument (e.g., a vertical accelerometer or air data computer) or by differentiating the value of H with respect to time. Thereafter, the value of $H - H_{REQ}$ is divided by the value of H'. The result is the chronodrasic interval $I_1$. It is to be understood that FIG. 20 is merely an example of one sequence of performing the required steps. Obviously, other sequences can be followed.

As with the other embodiments of the invention, obviously, the sequence of steps utilized to develop the chronodrasic interval for a terrain avoidance maneuver are continuously performed so that the value of $I_1$ is continuously updated. Moreover, as with the other embodiments of the invention, a display of the chronodrasic interval can be used to apprise the pilot of the effectiveness of action taken to avoid the terrain. For example, if the pilot increases thrust, obviously, the thrust increase will have an effect on the next value of $I_1$ determined. Similarly, if the flap setting is changed, fuel is ejected (to change gross weight) or the indicated airspeed changes (due, for example, to an increase in wind velocity or change in the direction of the aircraft such that wind velocity increases) the chronodrasic interval displayed will change accordingly.

Figure 21:
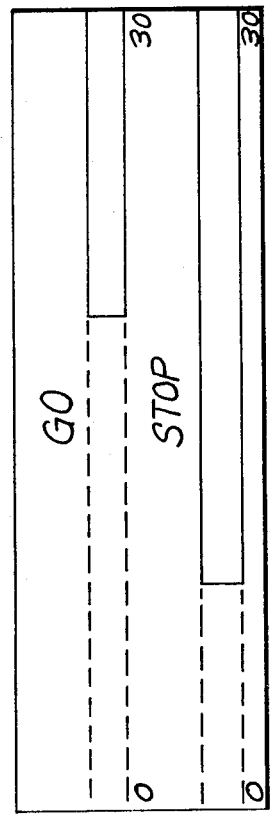

Preferably, the display used with the invention is a bar display. As shown in FIG. 21, the display may include both stop and go (takeoff) bars, simultaneously displayed if both options are available. The displays may be formed of matrices of light emitting diodes (LEDs) and function such that the length of the bar increases from right to left as the displayed chronodrasic interval decreases.

It will be appreciated from the foregoing description that the invention provides a method and apparatus for determining chronodrasic intervals. In the case of the apparatus, the result is in the form of electrical signals that either can be used to control a display or can be used in a feedback manner to control the application of parameter control, i.e., brake power to the aircraft (stopping) or power to the engines (takeoff). Moreover, two or more control signals can be simultaneously produced with one being used to override the others depending upon the most desired objective (i.e., takeoff or stopping, for example). However, should the most desired objective be impossible to achieve, i.e., takeoff, the system could automatically switch to controlling the achieving of the other objective, e.g., stopping.

As noted above, while the invention was developed for use in conjunction with an aircraft, the chronodrasic interval concept herein described can be applied to many other systems. That is, there are many systems wherein partial or full loss of performance of a particular system or subsystem could result in the inability to achieve a desired objective. In many such cases, it is possible to take action to achieve the desired objective if the action is taken early enough. The use of the chronodrasic interval method and apparatus of the invention in such subsystems will advise an operator of the need to take action and the time interval available to take action in order for the desired objective to be met. Alternatively, the invention can be used in a feedback arrangement to control the action taken. Consequently, the invention can be practiced otherwise than as specifically described herein.

The embodiments of the invention in which an exclusive property or or privilege is claimed are defined as follows:

1. A method of determining the amount of a parameter remaining to take maximum control action to achieve a desired objective (e.g., the chronodrasic interval) comprising the steps of:

determining the amount of a parameter required to achieve the desired objective if maximum control action is immediately applied;

determining the amount of the parameter remaining;

deducting the amount of the parameter required to achieve the desired objective if maximum control action is immediately applied from the amount of the parameter remaining;

determining a preselected rate of change of the parameter; and, dividing the result of deducting the amount of the parameter required to achieve the desired objective if maximum control action is immediately applied from the amount of the parameter remaining by the preselected rate of change of the parameter.

2. The method claimed in claim 1 wherein said preselected rate of change of the parameter is the present rate of change of the parameter.

3. The method claimed in claim 2 wherein:
   said parameter is distance;
   said desired objective is changing the speed of a vehicle from its present speed to a predetermined speed; and,
   said maximum control action is the maximum speed change that can be applied to said vehicle.

4. The method claimed in claim 3 wherein said vehicle is an aircraft.

5. The method claimed in claim 4 wherein said distance is horizontal distance.

6. The method claimed in claim 5 wherein:
   said aircraft is on a runway; and,
   said distance is the runway distance between the present position of the aircraft and a predetermined point on the runway.

7. The method claimed in claim 6 wherein:
   the speed of the aircraft is changed by applying brake force to reduce the speed of the aircraft; and,
   the maximum speed change is the speed change produced by the maximum available brake force.

8. The method claimed in claim 7 wherein:
   said predetermined point on the runway is a turnoff ramp; and,
   said predetermined speed is a speed at which the aircraft can safely turn off from said runway onto said turnoff ramp.

9. The method claimed in claim 7 wherein:
   said predetermined point is the end of the runway; and,
   said predetermined speed is zero.

10. The method claimed in claim 6 wherein:
    the speed of the aircraft is changed by increasing the thrust applied to said aircraft to increase the speed of the aircraft; and,
    the maximum speed change is the speed change produced by the maximum available thrust.

11. The method claimed in claim 10 wherein:
    said predetermined point is the end of the runway; and,
    said predetermined speed is the takeoff speed of the aircraft.

12. The method claimed in claim 1 wherein said preselected rate of change of the parameter is the maximum rate of change of the parameter.

13. The method claimed in claim 12 wherein:
    said parameter is distance;
    said desired objective is changing the speed of a vehicle from its present speed to a predetermined speed; and
    said maximum control action is the maximum speed change that can be applied to said vehicle.

14. The method claimed in claim 13 wherein said vehicle is an aircraft.

15. The method claimed in claim 14 wherein said distance is horizontal distance.

16. The method claimed in claim 15 wherein:
    said aircraft in on a runway; and,
    said distance is the runway distance between the present position of the aircraft and a predetermined point on the runway.

17. The method claimed in claim 16 wherein:
    the speed of the aircraft is changed by increasing the thrust applied to said aircraft to increase the speed of the aircraft; and,
    the maximum speed change is the speed change produced by the maximum available thrust.

18. The method claimed in claim 17 wherein:
    said predetermined point is the end of the runway; and,
    said predetermined speed is the takeoff speed of the aircraft.

19. A method of continuously determining the time remaining to apply maximum speed change action to an aircraft to cause the present speed of the aircraft to change to a predetermined speed prior to the aircraft reaching a predetermined point on a runway comprising the steps of:

continuously determining the time required to change the speed of the aircraft from its present speed to said predetermined speed if maximum speed change action is immediately applied;

continuously determining the time to reach said predetermined point on the runway based on the assumption that no further speed change action will be applied; and, continuously deducting half the time required to change the speed of the aircraft from its present speed to said predetermined speed if maximum speed change action is immediately applied from the time to reach said predetermined point on the runway based on the assumption that no further speed change action will be applied.

20. The method claimed in claim 19 wherein:
    the runway distance between the present position of said aircraft and said predetermined point on the runway constitutes a predetermined distance; and,
    the time required to reach said predetermined point on said runway based on the assumption that no further speed change action will be applied is determined by dividing said predetermined distance by the present speed of said aircraft.

21. The method claimed in claim 20 wherein:
    the speed of the aircraft is changed by applying brake force to reduce the speed of the aircraft; and, the maximum speed change is the speed change produced by the maximum available brake force.

22. The method claimed in claim 21 wherein:
said predetermined point on the runway is a turnoff ramp; and,
said predetermined speed is a speed at which the aircraft can safely turn off from said runway onto said turnoff ramp.

23. The method claimed in claim 21 wherein:
said predetermined point is the end of the runway; and,
said predetermined speed is zero.

24. The method claimed in claim 20 wherein:
the speed of the aircraft is changed by increasing the thrust applied to said aircraft to increase the speed of the aircraft; and,
the maximum speed change is the speed change produced by the maximum available thrust.

25. The method claimed in claim 24 wherein:
said predetermined point is the end of the runway; and,
said predetermined speed is the takeoff speed of the aircraft.

26. The method claimed in claim 20 wherein said maximum speed change is based on the value of $\mu g$ where $\mu$ is the coefficient of friction of the runway and g is the universal gravitational constant.

27. The method claimed in claim 20 wherein the time required to achieve said predetermined speed is calculated by dividing the difference between the present speed of said aircraft and the predetermined speed by a constant related to condition of the runway.

28. A method of continuously determining the time remaining to apply maximum speed change action to an aircraft to cause the present speed of the aircraft to change to a predetermined speed prior to the aircraft reaching a predetermined point on a runway comprising the steps of:
continuously determining the time required to change the speed of the aircraft from its present speed to said predetermined speed if maximum speed change action is immediately applied;
continuously determining the time to reach said predetermined point on the runway based on the assumption that no further speed change action will occur after said predetermined speed is reached; and,
continuously deducting half the time required to change the speed of the aircraft from its present speed to said predetermined speed if maximum speed change action is immediately applied from the time to reach said predetermined point on the runway based on the assumption that no further speed change action will occur after said predetermined speed is reached.

29. The method claimed in claim 28 wherein:
the runway distance between the present position of said aircraft and said predetermined point on the runway constitutes a predetermined distance; and,
the time required to reach said predetermined point on said runway based on the assumption that no further speed change action will occur after said predetermined speed is reached is determined by dividing said predetermined distance by the predetermined speed of said aircraft.

30. The method claimed in claim 29 wherein:
the speed of the aircraft is changed by increasing the thrust applied to said aircraft to increase the speed of the aircraft; and,
the maximum speed change is the speed change produced by the maximum available thrust.

31. The method claimed in claim 30 wherein:
said predetermined point is the end of the runway; and,
said predetermined speed is the takeoff speed of the aircraft.

32. A method of continuously determining the time remaining to apply maximum descent control action to stop the descent of an aircraft and avoid terrain comprising the steps of:
continuously determining the altitude required to stop the descent of the aircraft if maximum descent control action is immediately applied;
continuously determining the present altitude of the aircraft above the terrain;
deducting the altitude required to stop the descent of the aircraft if maximum control action is immediately applied from the present altitude of the aircraft above the terrain;
determining the rate of descent of the aircraft; and,
dividing the result of deducting the altitude required to stop the descent of the aircraft if maximum control action is immediately applied from the present altitude of the aircraft above the terrain by the rate of descent of the aircraft.

33. The method claimed in claim 32 wherein the step of continuously determining the altitude required to stop the descent of the aircraft if maximum descent control action is immediately applied is based on the present gross weight, flap setting, airspeed and thrust of the aircraft.

34. Apparatus for determining the time remaining to apply maximum velocity change action to change the velocity of a vehicle to a predetermined value by the time the vehicle moves from its present position to a predetermined position, said apparatus comprising:
(A) signal means for producing a first signal related to the distance between the present position of said vehicle and said predetermined position and a second signal related to the maximum velocity change action available to said vehicle;
(B) velocity means for producing a velocity signal related to the speed of said vehicle; and,
(C) data processing means for:
 (1) receiving said first and second signals, and said velocity signal;
 (2) determining the time required to change the velocity of said vehicle to said predetermined value if maximum velocity change action is immediately applied;
 (3) determining the time required for the vehicle to move from its present position to said predetermined position based on the distance between said present position and said predetermined position and on a preselected velocity of said vehicle; and,
 (4) deducting said time required to change the velocity of said vehicle to said predetermined value if maximum velocity change action is immediately applied from said time required for said vehicle to move from its present position to said predetermined position based on the distance between said present position and said predetermined position and on the preselected velocity of said vehicle.

35. Apparatus as claimed in claim 34 wherein said preselected velocity of said vehicle is the present velocity of said vehicle.

36. Apparatus as claimed in claim 35 wherein said vehicle is moving over a surface and said second signal is related to the coefficient of friction of said surface over which the vehicle is moving.

37. Apparatus as claimed in claim 34 wherein said preselected velocity of said vehicle is said predetermined value.

38. Apparatus for continuously determining the time remaining to apply maximum action to change the speed of an aircraft from its present speed to a predetermined speed before the aircraft reaches a predetermined position as it moves down a runway, said apparatus comprising:
(A) signal means for continuously producing a first signal related to the distance between the present position of said aircraft and said predetermined position and a second signal related to the maximum change in speed that can be achieved by said aircraft;
(B) speed means for continuously producing a speed signal related to the present speed of said aircraft; and,
(C) data processing means for:
(1) receiving said first and second signals and said speed signal;
(2) continuously determining the time required to change the speed of said aircraft to said predetermined speed by dividing the difference between the present and predetermined speeds of said aircraft by said maximum change in speed that can be achieved by said aircraft;
(3) continuously determining the time required for the aircraft to move from its present position to said predetermined position on said runway by dividing the distance between said present position and said predetermined position by a preselected speed of said aircraft; and,
(4) continuously deducting half said time required to change the speed of said aircraft to said predetermined speed determined by dividing the difference between the present and predetermined speeds of said aircraft by said maximum change in speed that can be achieved by said aircraft from said time required for said aircraft to move from its present position to said predetermined position on said runway determined by dividing the distance between said present position and said predetermined position by the preselected speed of said aircraft.

39. Apparatus as claimed in claim 38 wherein said preselected speed is said present speed of said aircraft.

40. Apparatus as claimed in claim 39 wherein:
said signal means includes initializing means for producing an initial signal related to the distance between the present position of said aircraft and said predetermined position and a memory for receiving and storing said initial signal;
and,
said data processing means continuously updates said initial signal by reducing said initial signal at predetermined intervals by the amount of runway distance covered by said aircraft during the predetermined interval immediately preceeding the updating of said initial signal.

41. Apparatus as claimed in claim 40 wherein said initializing means includes a manually operated switch.

42. Apparatus as claimed in claim 41 wherein said maximum change in speed that can be achieved by said aircraft is related to the coefficient of friction of said runway and wherein said signal means includes runway coefficient means for producing said second signal.

43. Apparatus as claimed in claim 42 wherein said runway coefficient means includes a manually operated switch.

44. Apparatus as claimed in claim 42 wherein said predetermined position is the end of the runway and said predetermined speed is zero, whereby said first signal is related to the length of said runway.

45. Apparatus as claimed in claim 42 wherein said predetermined position is a turnoff ramp from said runway and said predetermined speed is a safe turnoff speed, whereby said first signal is related to the distance between the present position of said aircraft and said turnoff ramp.

46. Apparatus as claimed in claim 38 wherein said preselected speed is said predetermined speed of said aircraft.

* * * * *

UNITED STATES PATENT AND TRADEMARK OFFICE
CERTIFICATE OF CORRECTION

PATENT NO. : 4,454,582  Page 1 of 6
DATED : June 12, 1984
INVENTOR(S) : Patrick J. Cleary et al.

It is certified that error appears in the above-identified patent and that said Letters Patent is hereby corrected as shown below:

| | | |
|---|---|---|
| Column 1, Line 61, | "judgement" should be --judgment-- | |
| Column 4, Line 20, | "(A)" should be --(A)-- | |
| Column 5, Equation 2, | "$X_0'$" should be --$X'_0$-- both occurrences | |
| Column 5, Equation 3, | "$X_0'$" should be --$X'_0$-- both occurrences | |
| Column 6, Line 8, | "behavair" should be --behavior-- | |
| Column 7, Equation 4, | "$X_0'$" should be --$X'_0$-- "$X_0''$" should be --$X''_0$-- | |
| Column 7, Equation 6, | "$X_0'$" should be --$X'_0$-- "$X_0''$" should be --$X''_0$-- | |
| Column 8, Equation 8, | "$X_0'$" should be --$X'_0$-- "$X_0''$" should be --$X''_0$-- | |
| Column 8, Equation 10, | "$X_0'$" should be --$X'_0$-- "$X_0''$" should be --$X''_0$-- | |
| Column 8, Equation 11, | "$X_0'$" should be --$X'_0$-- all four occurrences "$X_0''$" should be --$X''_0$-- all three occurrences | |
| Column 8, Equation 12, | "$X_0'$" should be --$X'_0$-- both occurrences "$X_0''$" should be --$X''_0$-- | |

UNITED STATES PATENT AND TRADEMARK OFFICE
CERTIFICATE OF CORRECTION

PATENT NO. : 4,454,582

DATED : June 12, 1984

INVENTOR(S) : Patrick J. Cleary et al.

It is certified that error appears in the above-identified patent and that said Letters Patent is hereby corrected as shown below:

| | |
|---|---|
| Column 8, Equation 13, | "$X_0'$" should be --$X'_0$-- both occurrences |
| | "$X_0''$" should be --$X''_0$-- |
| Column 9, Equation 14, | "$X_0'$" should be --$X'_0$-- both occurrences |
| | "$X_0''$" should be --$X''_0$-- |
| Column 9, Line 10, | "thus" should be --Thus-- |
| Column 9, Equation 15, | "$X_0'$" should be --$X'_0$-- both occurrences |
| | "$X_0''$" should be --$X''_0$-- |
| Column 9, Equation 16, | "$X_0'$" should be --$X'_0$-- both occurrences |
| | "$X_0''$" should be --$X''_0$-- |
| Column 9, Equation 17, | "$X_0'$" should be --$X'_0$-- all three occurrences |
| | "$X_0''$" should be --$X''_0$-- |
| Column 9, Equation 18, | "$X_0'$" should be --$X'_0$-- both occurrences |
| Column 10, Equation 19, | "$X_0'$" should be --$X'_0$-- all three occurrences |
| Column 13, Line 37, | "a 8080A" should be --an 8080A-- |
| Column 13, Line 39, | "a 8228" should be --an 8228-- |
| Column 13, Line 43, | "a 8224" should be --an 8224-- |
| Column 13, Line 56, | "86" should be --87-- |

UNITED STATES PATENT AND TRADEMARK OFFICE
CERTIFICATE OF CORRECTION

PATENT NO. : 4,454,582

DATED : June 12, 1984

INVENTOR(S) : Patrick J. Cleary et al.

Page 3 of 6

It is certified that error appears in the above-identified patent and that said Letters Patent is hereby corrected as shown below:

| | |
|---|---|
| Column 13, Line 60, | after "and," insert --two-- |
| Column 17, Line 61, | "$\sim$" should be --$\mu$-- |
| Column 19, Equation 22, | "$X_0$'" should be --$X'_0$-- |
| Column 19, Equation 23, | "$X_0$'" should be --$X'_0$-- |
| Column 19, Equation 24, | "$X_0$'" should be --$X'_0$-- both occurrences |
| Column 20, Equation 26, | "$X_0$'" should be --$X'_0$-- |
| Column 20, Equation 27, | "$A(I_2)$" should be --$\overline{A}(I_2)$-- |
| Column 20, Equation 28, | "$X_0$'" should be --$X'_0$-- |
| Column 20, Equation 29, | "$A\ I_2$" should be --$\overline{A}\ I_2$-- |
| Column 21, Equation 30, | "$X_0$'" should be --$X'_0$-- |
| | "$X_R$'" should be --$X'_R$-- |
| Column 21, Equation 31, | "$X_0$'" should be --$X'_0$-- both occurrences |
| | "$X_R$'" should be --$X'_R$-- |
| Column 21, Equation 32, | "$X_0$'" should be --$X'_0$-- both occurrences |
| | "$X_R$'" should be --$X'_R$-- |
| Column 21, Equation 33, | "$X_0$'" should be --$X'_0$-- both occurrences |
| | "$X_R$'" should be --$X'_R$-- |
| | "$2\overline{A}X_0$'" should be --$2\overline{A}X'_0$-- |

UNITED STATES PATENT AND TRADEMARK OFFICE
CERTIFICATE OF CORRECTION

PATENT NO. : 4,454,582
DATED : June 12, 1984
INVENTOR(S) : Patrick J. Cleary et al.

It is certified that error appears in the above-identified patent and that said Letters Patent is hereby corrected as shown below:

| | |
|---|---|
| Column 21, Equation 34, | "$X_0'$" should be --$X'_0$-- both occurrences |
| | "$X_R'$" should be --$X'_R$-- |
| | "$2AX_0'$" should be --$2AX'_0$-- |
| Column 22, Equation 35, | "$X_0'$" should be --$X'_0$-- both occurrences |
| | "$X_R'$" should be --$X'_R$-- |
| Column 22, Equation 36, | "$X_0'$" should be --$X'_0$-- all five occurrences |
| | "$X_R'$" should be --$X'_R$-- |
| Column 22, Equation 37, | "$X_0'$" should be --$X'_0$-- all three occurrences |
| | "$X_R'$" should be --$X'_R$-- |
| Column 22, Equation 38, | "$X_0'$" should be --$X'_0$-- all four occurrences |
| | "$X_R'$" should be --$X'_R$-- |
| Column 22, Equation 39, | "$X_0'$" should be --$X'_0$-- all five occurrences |
| | "$X_R'$" should be --$X'_R$-- both occurrences |
| Column 22, Equation 40, | "$X_0'$" should be --$X'_0$-- both occurrences |

UNITED STATES PATENT AND TRADEMARK OFFICE
CERTIFICATE OF CORRECTION

PATENT NO. : 4,454,582  
DATED : June 12, 1984  
INVENTOR(S) : Patrick J. Cleary et al.

Page 5 of 6

It is certified that error appears in the above-identified patent and that said Letters Patent is hereby corrected as shown below:

| | |
|---|---|
| Column 22, Equation 41, | "$X_0'$" should be --$X'_0$-- all three occurrences |
| Column 22, Lines 62-65, | "$X_0'$" should be --$X'_0$-- both occurrences |
| Column 23, Line 29, | "$X_R'$" should be --$X'_R$-- |
| Column 23, Line 31, | "$X_R'$" should be --$X'_R$-- |
| Column 23, Line 32, | "$X_0'$" should be --$X'_0$-- |
| Column 23, Equation 42, | "$X_R'$" should be --$X'_R$-- |
| Column 23, Equation 43, | "$X_0'$" should be --$X'_0$-- |
| Column 23, Equation 44, | "$X_R'$" should be --$X'_R$-- |
| Column 23, Equation 45, | "$X_0'$" should be --$X'_0$-- |
| | "$X_R'$" should be --$X'_R$-- |
| Column 23, Equation 46, | "$X_0'$" should be --$X'_0$-- |
| | "$X_R'$" should be --$X'_R$-- both occurrences |
| Column 23, Equation 47, | "$X_0'$" should be --$X'_0$-- |
| | "$X_R'$" should be --$X'_R$-- both occurrences |
| | "$2\overline{A}X_R'$" should be --$2\overline{A}X'_R$-- |
| Column 24, Line 2, | "$X_0'$" should be --$X'_0$-- |

UNITED STATES PATENT AND TRADEMARK OFFICE
CERTIFICATE OF CORRECTION

PATENT NO. : 4,454,582

DATED : June 12, 1984

INVENTOR(S) : Patrick J. Cleary et al.

It is certified that error appears in the above-identified patent and that said Letters Patent is hereby corrected as shown below:

| | |
|---|---|
| Column 24, Equation 48, | "$X_0'$" should be --$X'_0$-- |
| | "$X_R'$" should be --$X'_R$-- |
| | "$2\overline{A}X_R'$" should be --$2\overline{A}X'_R$-- |
| Column 24, Equation 49, | "$X_0'$" should be --$X'_0$-- all three occurrences |
| | "$X_R'$" should be --$X'_R$-- |
| | "$2\overline{A}X_R'$" should be --$2\overline{A}X'_R$-- |
| Column 24, Equation 50, | "$X_0'$" should be --$X'_0$-- |
| Column 24, Equation 51, | "$X_R'$" should be --$X'_R$-- both occurrences |
| Column 25, Line 13, | "through" should be --though-- |
| Column 25, Line 30, | after "aircraft" insert --type-- |
| Column 26, Line 7, | "substracted" should be --subtracted-- |
| Column 27, Line 16, | ":" should be --;-- |

Signed and Sealed this

Seventh Day of May 1985

[SEAL]

Attest:

DONALD J. QUIGG

Attesting Officer

Acting Commissioner of Patents and Trademarks